(12) United States Patent
Khandekar et al.

(10) Patent No.: US 9,048,993 B2
(45) Date of Patent: Jun. 2, 2015

(54) WIRELESS COMMUNICATION CHANNEL BLANKING

(75) Inventors: Aamod D. Khandekar, San Diego, CA (US); Ravi Palanki, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1477 days.

(21) Appl. No.: 12/642,535

(22) Filed: Dec. 18, 2009

(65) Prior Publication Data
US 2011/0151790 A1 Jun. 23, 2011

(51) Int. Cl.
*H04B 1/00* (2006.01)
*H04B 15/00* (2006.01)
*H04L 5/00* (2006.01)

(52) U.S. Cl.
CPC ............ *H04L 5/0062* (2013.01); *H04L 5/0007* (2013.01)

(58) Field of Classification Search
USPC ............... 455/522, 63.1, 67.11, 67.13, 67.15, 455/68–69, 561, 114.2, 127.1, 296; 375/346, 351
See application file for complete search history.

(56) References Cited

U.S. PATENT DOCUMENTS

| | | | |
|---|---|---|---|
| 7,994,975 B2* | 8/2011 | Abraham et al. ........ 342/357.59 |
| 8,010,055 B2* | 8/2011 | Buer ............................. 455/78 |
| 8,026,845 B2* | 9/2011 | Wolf ........................ 342/357.29 |
| 8,085,831 B2 | 12/2011 | Teague | |
| 8,150,325 B1* | 4/2012 | Prichard ...................... 455/63.1 |
| 8,320,834 B2* | 11/2012 | Lu et al. ....................... 455/63.1 |
| 8,335,176 B2* | 12/2012 | Ji et al. .......................... 370/312 |
| 8,504,091 B2 | 8/2013 | Palanki et al. | |
| 2009/0130979 A1* | 5/2009 | Bhushan et al. ............. 455/63.1 |
| 2009/0130980 A1 | 5/2009 | Palanki et al. | |
| 2009/0197629 A1 | 8/2009 | Borran et al. | |
| 2009/0247084 A1 | 10/2009 | Palanki | |
| 2009/0247086 A1 | 10/2009 | Lin et al. | |
| 2009/0247181 A1 | 10/2009 | Palanki et al. | |

(Continued)

FOREIGN PATENT DOCUMENTS

| | | |
|---|---|---|
| JP | 2009260566 A | 11/2009 |
| WO | WO-2005117283 A2 | 12/2005 |
| WO | WO-2009132133 A1 | 10/2009 |

OTHER PUBLICATIONS

Batra A, et al., "Multi-band OFDM: A Cognitive Radio for UWB", 2006 IEEE International Symposium on Circuits and Systems May 21-24, 2006 Island of Kos, Greece, IEEE—Piscataway, NJ, USA, May 21, 2006, pp. 4094-4097, XP010939591.
International Search Report and Written Opinion—PCT/US2010/024176, International Search Authority—European Patent Office—Feb. 7, 2011.

(Continued)

*Primary Examiner* — Tuan A Tran
(74) *Attorney, Agent, or Firm* — Dalei Dong

(57) ABSTRACT

Systems and methodologies are described that facilitate blanking on portions of bandwidth, such as a subset of interlaces, utilized by communicating devices that are dominantly interfered by a disparate device in wireless communications networks. The portions of bandwidth can relate to critical data, such as control data, and one or more of the communicating devices can request that the dominantly interfering device blank on one or more of the portions. The communicating devices can subsequently transmit data over the blanked portions free of the dominant interference. Additionally, the dominantly interfering device can request reciprocal blanking from the one or more communicating devices.

46 Claims, 15 Drawing Sheets

(56) References Cited

U.S. PATENT DOCUMENTS

2010/0099449 A1* 4/2010 Borran et al. .................. 455/501
2010/0184380 A1* 7/2010 Zhou et al. .................... 455/63.1

OTHER PUBLICATIONS

Taiwan Search Report—TW099104865—TIPO—Nov. 30, 2013.
European Search Report - EP14189627 - Search Authority - The Hague - Aug. 12, 2008 (082298EPD1).

* cited by examiner

WIRELESS COMMUNICATION CHANNEL BLANKING

BACKGROUND

1. Field

The following description relates generally to wireless communications, and more particularly to interference over wireless communications channels.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. However, such systems can have associated interference as the multiple antennas for the multiple transmitters and multiple receivers can be in communication at the same time. Previous solutions to this interference involve calculating and accounting for an interference level as a mobile device connects to a base station having the highest signal quality in most cases. However, with the advent of other technologies and functionalities, priority of connection points may not be based on the signal quality.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating blanking communications channels of one or more transmitting devices to allow a disparate transmitting device to communicate with a receiver where the blanking transmitting device typically interferes with the disparate transmitting device and receiver. In this regard, a receiving device can communicate with a transmitting device that is not necessarily the transmitting device with the highest signal to noise ratio (SNR). Thus, there can be diversity in the base station to which a receiver communicates.

According to related aspects, a method is provided that includes receiving one or more parameters regarding performance of a device in a wireless communication network and determining an interference to the device based at least in part on the one or more parameters. The method also includes blanking transmission over a subset of interlaces utilized by the device to communicate with a base station to mitigate the interference to the device on the subset of interlaces Another aspect relates to a wireless communications apparatus. The wireless communications apparatus can include at least one processor configured to obtain one or more parameters related to performance of a device in communicating with a base station and detect interference to the device by the wireless communications apparatus based at least in part on the one or more parameters. The at least one processor is further configured to blank transmission over a subset of resources utilized by the device to communicate with the base station to mitigate interference over the subset of resources. The wireless communications apparatus also comprises a memory coupled to the at least one processor.

Yet another aspect relates to an apparatus. The apparatus includes means for receiving one or more parameters related to performance of a device in a wireless communication network and means for detecting an interference to the device based at least in part on the one or more parameters. The apparatus also includes means for blanking transmission over a subset of resources utilized by the device in communicating in the wireless communication network.

Still another aspect relates to a computer program product, which can have a computer-readable medium including code for causing at least one computer to receive one or more parameters regarding performance of a device in a wireless communication network and code for causing the at least one computer to determine an interference to the device based at least in part on the one or more parameters. The computer-readable medium can also comprise code for causing the at least one computer to blank transmission over a subset of resources utilized by the device to communicate with a base station to mitigate the interference to the device on the subset of resources.

Moreover, an additional aspect relates to an apparatus including an interference information receiver that obtains one or more parameters related to performance of a device in a wireless communication network and an interference level determiner that discerns an interference to the device based at least in part on the one or more parameters. The apparatus can further include an interlace blanker that blanks transmission over a subset of resources utilized by the device in communicating in the wireless communication network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
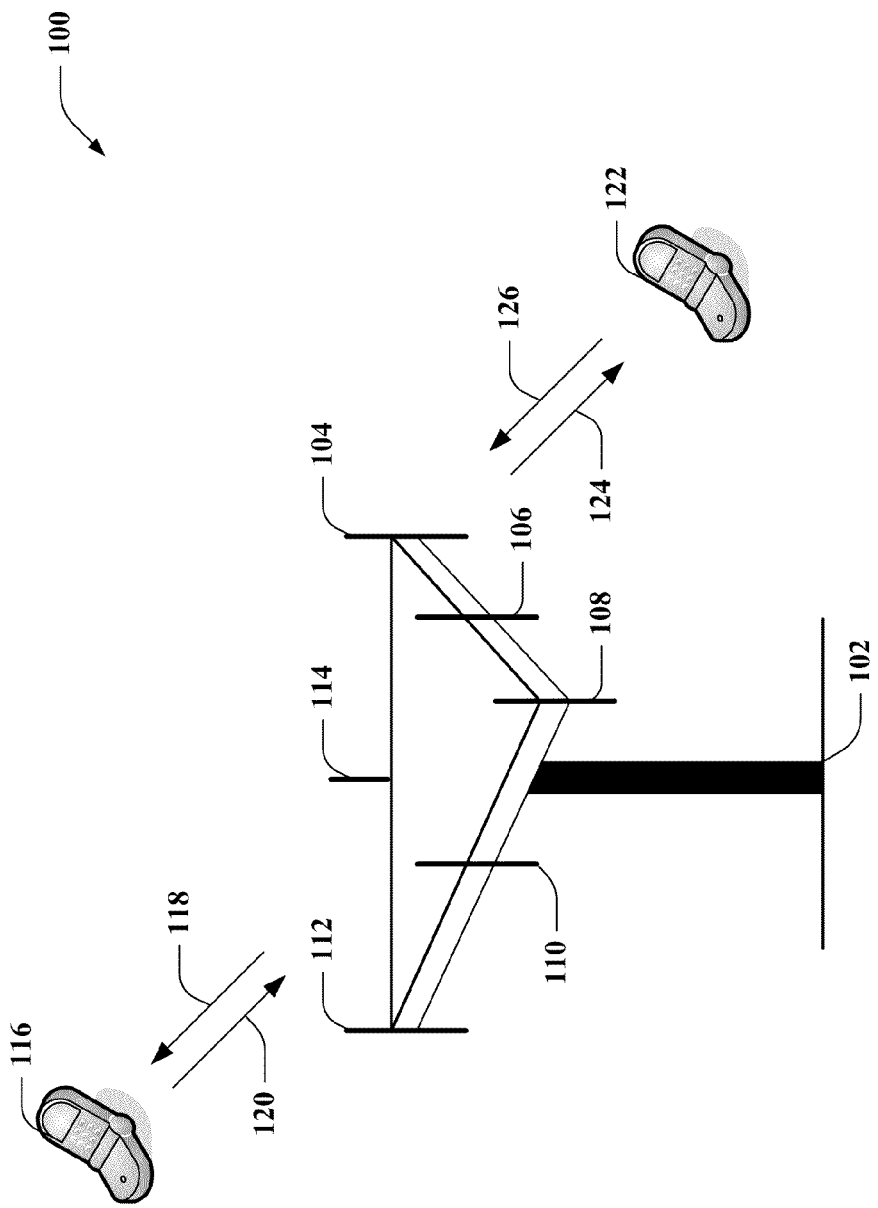
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. The communication channels can comprise one or more logical channels. Such logical channels can be provided for transmitting control data between the mobile devices 116 and 122 and the base station 102 (or from mobile device 116 to mobile device 122 in a peer-to-peer configuration, for example). In an example, the mobile devices 116 and 122 can send channel quality information (CQI) to the base station 102 to indicate parameters regarding an allocated communication channel. Based on the CQI control data, for example, the base station 102 can allocate additional channel resources to the mobile devices 116 and/or 122. Additionally, the base station 102 can send control data to the mobile devices 116 and/or 122, such as acknowledgement information related to receiving data from the devices, over the control channels.

In an example, the base station 102 can blank a portion of channels, meaning it can reduce power utilized to transmit the channels, to allow communication between disparate devices or base stations where the base station 102 is a strong interferer. Thus, devices can connect to access points or base stations based on desire and not necessarily geographical desirability or a maximum signal to noise ratio (SNR). For example, though not shown, mobile device 122 can communicate with a disparate base station that has a lower SNR than base station 102; thus, base station 102 interferes with the communication as it has a better signal for mobile device 122. To allow mobile device 122 to effectively communicate with the disparate base station, base station 102 can blank transmission on certain channels such that the mobile device 122 can utilize those channels to communicate with the disparate base station. It is to be appreciated that the blanking need not entail removing entire power from a channel, though it can. Additionally, the power removed in blanking can be configurable and/or can depend on specific requirements of a communicating device or a measured interference level, for example. It is to be appreciated that in addition or alternative to the base station 102 blanking on control channels of the downlink, the mobile device(s) 116 and/or 122 can blank on control channels of the uplink, for example.

Where the blanking includes reducing power to a channel to allow disparate devices to communicate, devices communicating with the blanking base station 102 (such as mobile device 116) can still receive data over the blanked channels; however the SNR is not as high as regular transmissions (e.g., the communication appears as a deep fade). Additionally, the blanked bandwidth can be compensated by the base station 102 by increasing power utilized to transmit at the non-blanked channels in one example. It is to be appreciated that blanking transmission on resources is not limited to OFDMA configurations; rather this configuration is shown to aid explanation. For example, substantially any wireless communication configuration can utilize the functionality described herein.

Figure 2:
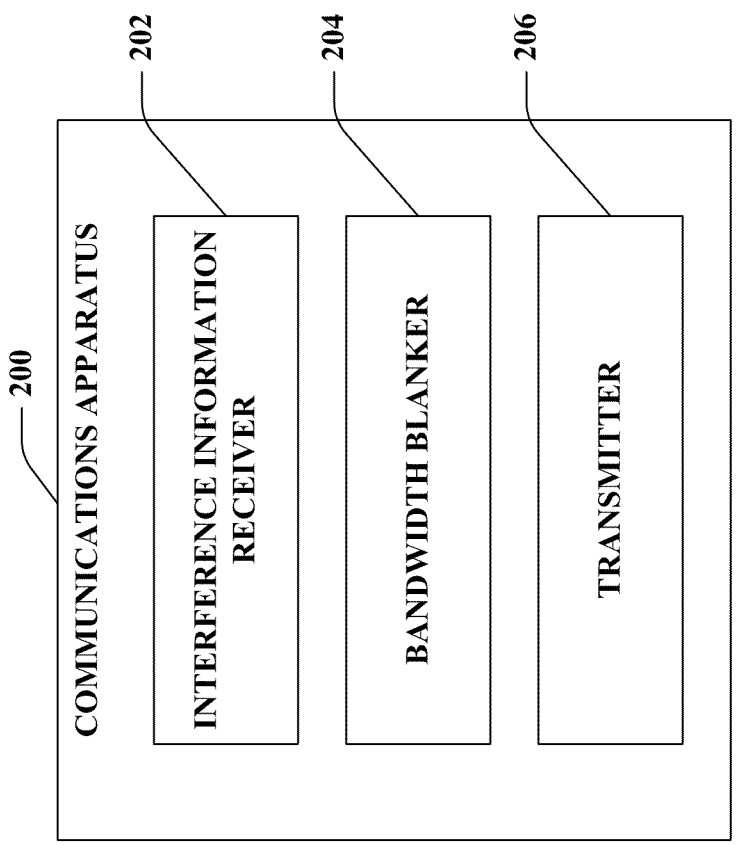
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include an interference information receiver 202 that can receive information related to interference caused by the communications apparatus 200 with other communicating devices, a bandwidth blanker 204 that can blank on certain communications bandwidth portions based at least in part on the interference related information, and a transmitter 206 that can transmit over the communications bandwidth and reduce or increase transmission power based at least in part on the blanking status of the bandwidth portions as determined by the bandwidth blanker 204.

According to an example, the interference information receiver 202 can acquire information relevant to the interference of the communications apparatus 200 with other communications between disparate devices. The information can be discerned or inferred by the communications apparatus 200 and/or provided by one or more disparate devices or components. The information can comprise portions of bandwidth utilized by the disparate devices to communicate with each other; in one example, the portions can be utilized for critical data such as control data. For instance, in an OFDMA wireless network configuration, the information can comprise location of one or more subcarriers utilized as control channels or other channels by the disparate devices in communicating that are interfered by the communications apparatus 200 (e.g., the communications apparatus 200 can be communicating with a disparate device using the relevant bandwidth or channel(s)). In addition, for example, the information can indicate a number of interlaces (e.g., a periodic set of subframes) utilized for communicating control data between the disparate devices, as described further herein. The bandwidth blanker 204 can blank on one or more of the channels (or subcarriers thereof) indicated in the received information.

As described, the blanking can include removing substantially all transmit power utilized by the transmitter 206 for the channel or a portion of the power. In another example, the received information can further include an interference level of the communications apparatus 200 such that the bandwidth blanker 204 can reduce power used in transmitting over the blanked channel(s) or bandwidth portions by the transmitter 206, instead of removing all power, and the reduced level can correspond to the interference level received. When the channels are blanked, the disparate devices can achieve desired communications without interference from the communications apparatus 200. It is to be appreciated that the communications apparatus 200, though receiving the interference information via interference information receiver 202, can determine when to blank on channels or other portions of bandwidth. For example, though the interference information receiver 202 may receive information related to certain channels to blank (e.g., in an OFDMA configuration) it does not need to necessarily blank on all channels in each physical frame, and in fact, the bandwidth blanker 204 can choose to blank only in certain physical frames and only on certain control channels or not to blank on anything at all. In one example, the bandwidth blanker 204 can further be utilized to raise transmission power for portions of the bandwidth it is not blanking; in one example, this can account for bandwidth lost during blanking.

According to one example, the communications apparatus 200 can communicate blanking information regarding portions of bandwidth the bandwidth blanker 204 will blank to the one or more disparate communicating devices. In this regard, the devices can rely on the blanking and transmit data (e.g., control data or otherwise) in the portions of bandwidth to ensure reliable communication with one another. In addition, one or more of the disparate devices can blank channels utilized by the communications apparatus 200 in reciprocal form. Thus, the communications apparatus 200 can transmit the blanking information along with portions of bandwidth it would like the disparate device to blank in return. It is to be appreciated that not all components shown are required. For example, the interference information receiver 202 can be optional such that the bandwidth blanker 204 can blank control channels of disparate communications apparatuses. In one example, for a heterogeneous deployment, the bandwidth blanker 204 can blank for control channels of lower powered communications apparatuses.

Figure 3:
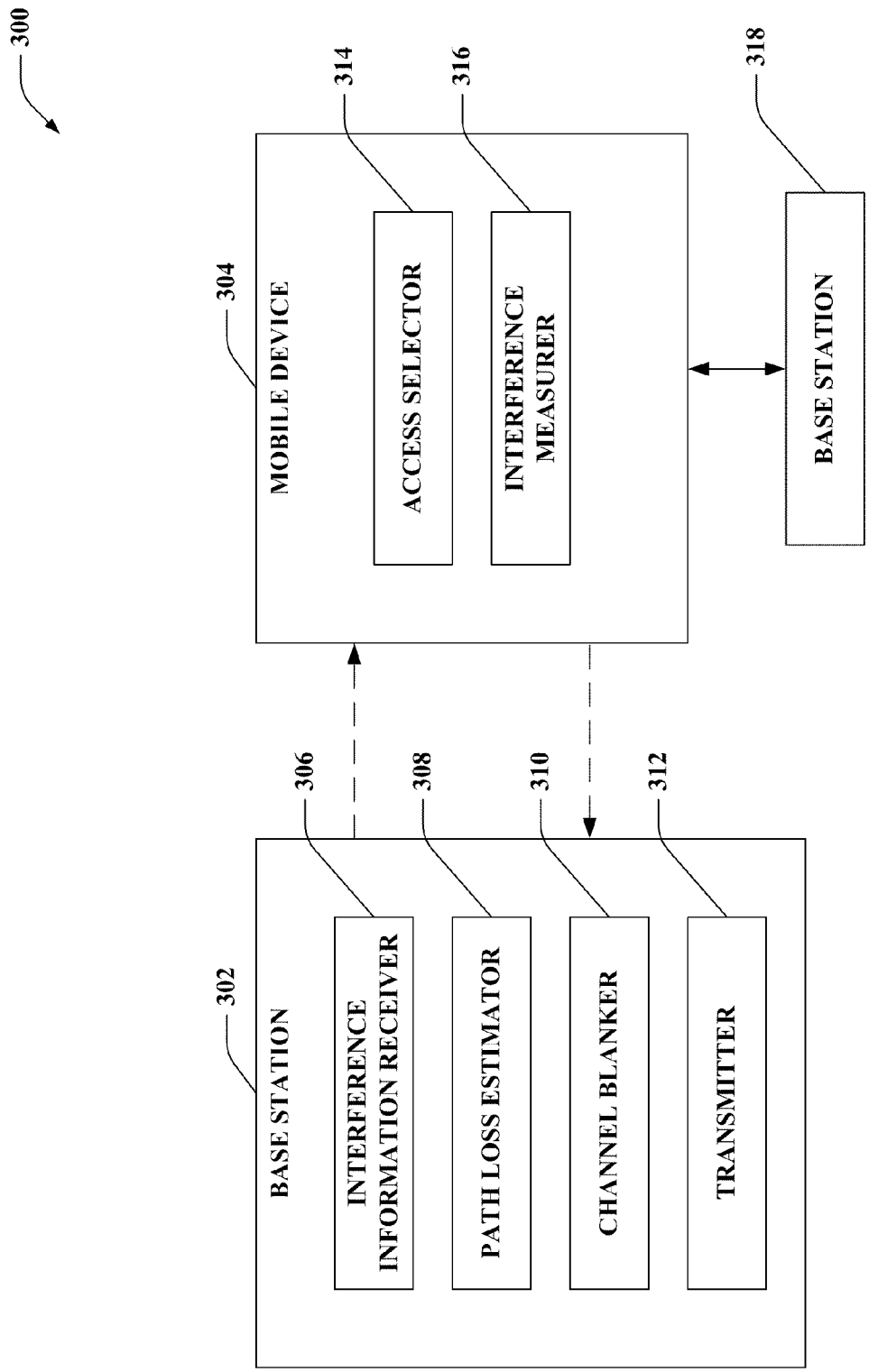
FIG. 3 is an illustration of an example wireless communications system that effectuates blanking and transmitting on otherwise dominantly interfered portions of bandwidth.

Now referring to FIG. 3, illustrated is a wireless communications system 300 that can mitigate dominant interference of one or more devices by blanking on relevant portions of bandwidth. The system 300 includes a base station 302 that can communicate with a plurality of disparate mobile devices (not shown). The mobile device 304 is communicating with base station 318 to facilitate wireless communication service. Base station 318 can transmit information to mobile device 304 over a forward link channel; further base station 318 can receive information from mobile device 304 over a reverse link channel. Moreover, system 300 can be a MIMO system. Additionally, the system 300 can operate in an OFDMA wireless network (such as 3GPP for example). Also, the components and functionalities shown and described below in the base stations 302 and 318 can be present in one another and/or the mobile device 304 as well and vice versa, in one example; the configuration depicted excludes these components for ease of explanation.

Base station 302 includes an interference information receiver 306 that can obtain information related to interference of the base station 302 with other communicating devices (such as mobile device 304 and base station 318), a path loss estimator 308 that can be utilized to determine or otherwise infer an interference level of the base station 302 with respect to other devices, a channel blanker 310 that can blank on channels utilized by the other devices as described above, and a transmitter 312 that transmits data to other devices with which the base station 302 is communicating. In one example, the interference information receiver 306 can receive information related to communications with which the base station 302 is interfering. Additionally or alternatively, the path loss estimator 308 can determine an interference level of the base station 302 based at least in part on an estimated path loss between the base station 302 and a device attempting to communicate over the interference of base station 302 (such as mobile device 304). It is to be appreciated that, in this example, the interference information receiver 306 may not be necessary as the information is discerned from the path loss estimation, for example. Once the information is received, the channel blanker 310 can blank (e.g., remove a portion or substantially all power) on one or more of the channels on which it is interfering. The transmitter 312 can transmit with the assigned power allowing the disparate devices to communicate without (or with substantially less) interference from the base station 302.

Mobile device 304 includes an access selector 314 that can be used to choose an access point for wireless communications and an interference measurer 316 that can determine interference from one or more disparate access points or transmitting devices. According to an example, the mobile device 304 can select a base station or other device, with which to initiate wireless communication, using the access selector 314. In this example, the mobile device 304 can choose to communicate with base station 318. This can be for various reasons such as services provided, protocols utilized, restricted association where the mobile device 304, or a user thereof, may not have authorization to connect to the base station 302, or base station 318, for example, can be in a user home or other area that can offer services or security not easily attainable with base station 302. Additionally, base stations 302 and 318 can be part of a heterogeneously deployed network where the mobile device 304, or a user thereof, may choose to connect to a lower powered base station with lower path-loss but worse SNR, etc. For example, in some cases, it can be desirable for a terminal to be served by a low-transmit power base station having lower path loss even though that base station can have a lower received power and lower SNR. This can be because the low-power base station can serve the mobile device while causing less interference to the network as a whole. Moreover, multiple low-power base stations can simultaneously serve distinct users or mobile devices making much more efficient use of the bandwidth as compared to the high-powered base station serving a single user/device.

It is to be appreciated that the mobile device 304 can additionally choose to communicate with a WiFi hotspot, a disparate mobile device, or substantially any other transmitting entity. Due to proximity and/or transmit strength of the base station 302, interference can occur on the communication link between the mobile device 304 and the base station 318. The interference can be measured by the interference measurer 316 and transmitted to the base station 302 for a blanking request in one example. It is to be appreciated that more than one base station can be a dominant interferer, and thus, blanking requests can be sent to substantially any number of a plurality of interferers.

According to an example, the base station 302 can determine that it is a dominant interferer to the mobile device 304/base station 318 communication. This can be determined, for example, by viewing a preamble transmission and/or pilot transmission of the mobile device 304; using the preamble, a path loss can be estimated by the path loss estimator 308 comprising the ratio of transmit power of the preamble by the mobile device 304 and the quality of the preamble as received by the base station 302. If the path loss is low (e.g., lower than a specified threshold), the base station 302 can be considered a dominant interferer based in part on an implication that the path loss should be worse with respect to communicating with the base station 318. In fact, this information, in one example, can be acquired as well for a more determinative calculation. The information can be acquired through substantially any method and/or device including received from the mobile device 304 (e.g., the mobile device 304 can determine the path loss using a preamble transmitted by the base station 318), received from other components of a wireless communications network (e.g., base station 318 or other network components), and/or the like.

Once base station 302 is determined to be the dominant interferer, in one example, interference information receiver 306 can receive or infer interfered channel locations utilized by the mobile device 304. In one example, the channel locations can be critical channels, such as control channels. The base station 302 can utilize the channel blanker 310 to blank transmission power used by the transmitter 312 for the relevant channels. The blanking can include removing substantially all power from the transmitter 312 for the given channels and/or simply reducing the power. In this case, the blanking can appear as a deep fade to a disparate device with which the base station 302 is communicating and may not have much of an adverse effect on the communication. Moreover, the power can be reduced at varying degrees as part of the blanking, and in one example, the degrees can be based on the path loss from the path loss estimator 308. For example, where the path loss from the base station 302 to the mobile device 304 is similar to that of the base station 318 and mobile device 304, the degree of blanking may not need to be as substantial as where the path loss for the base station 302 is sufficiently less than that related to the base station 318. Additionally, the base station 302 can increase power used to transmit during channels that are not blanked. As mentioned, it is to be appreciated that the aspects described herein are not limited to channels, but can be utilized with substantially any portion of bandwidth such that the blanking can occur with respect to a relevant portion of the bandwidth. In one example, described in further detail below, the portion of bandwidth can relate to a subset of interlaces of subframes in technologies such as LTE. In another example, the portions of bandwidth can relate to a subset of subframes, a subset of carriers, and/or the like. Moreover, the portions of bandwidth blanked can change, in one example, for given time periods.

In another example, blanking can be mutual such that where the base station 302 blanks given channels for mobile device 304, the mobile device 304 can blank on channels utilized by the base station 302 (though the components are not depicted but can be present as mentioned above). Thus, the base station 302 can inform the mobile device 304 that it is blanking control channels on the downlink of the mobile device 304/base station 318 communication; the mobile device 304 can correspondingly blank the uplink control channels related to communication between the base station 302 and a disparate device. This can be desirable, for example, since the path loss can be similar on the uplink and downlink. It is to be appreciated that the information regarding the control channel locations can be exchanged by the base station 302 and the mobile device 304 (and/or the base station 318), inferred from the activity of the receiving device, received from a disparate component of a wireless communications network, set as one or more configuration parameters, and/or the like.

In yet another example, the mobile device 304 can determine an interference level of the base station 302 over relevant channels using the interference measurer 316 and explicitly request the base station 302 blank on the relevant channels. For example, the mobile device 304 can transmit the request to the base station 302 over a dedicated control channel, a data channel, and/or the like. In addition, the mobile device 304 can utilize other components, such as the base station 318, to transmit the request to the base station 302 via over-the-air transmission to the base station 318, using a disparate network component, using a backhaul link between the base station 318 and base station 302 and/or intermediary components, for example. In another example, the base station 302 can receive information related to control channels utilized by the base station 318 from other mobile devices roaming throughout the area.

The blanking request can relate to certain channels, portions of bandwidth (e.g., subcarriers) over a specified time period, etc. The blanking request can also comprise a repetition factor over time or other bandwidth measurements, such as one or more frames or OFDM symbols, in one example. Additionally or alternatively, the mobile device 304 can transmit the request for blanking at each instance it desires blanking to occur. It is to be appreciated that the base station 302 need not grant the request, or can grant a portion of the request. Indeed, the base station 302 can also receive information regarding activity intervals for a mobile device 304 that is not in a fully active state and only blank at intervals where the mobile device 304 is active. In addition, for example, the base station 302 can transmit the determined blanking scheme to the mobile device 304 so the mobile device 304 can advantageously use the information to ensure reliable communication with the base station 318. It is to be appreciated that the blanking information can be transmitted using one or more of the techniques described for transmitting the request for blanking. Additionally, the base station 302 can increase power for transmissions where blanking is not requested. It is to be appreciated that the described functionalities can be implemented for uplink channels as well where the base station 302 can comprise the components shown in the mobile device 304 and vice versa. In this regard, the base station 302 can request that the mobile device 304 blank on its uplink control channels, and the mobile device 304 can grant the request over a portion of subcarriers. Additionally, not all components listed are required to implement functionalities described; as shown supra, the interference information receiver 306 is not necessary in all deployments.

Figure 4:
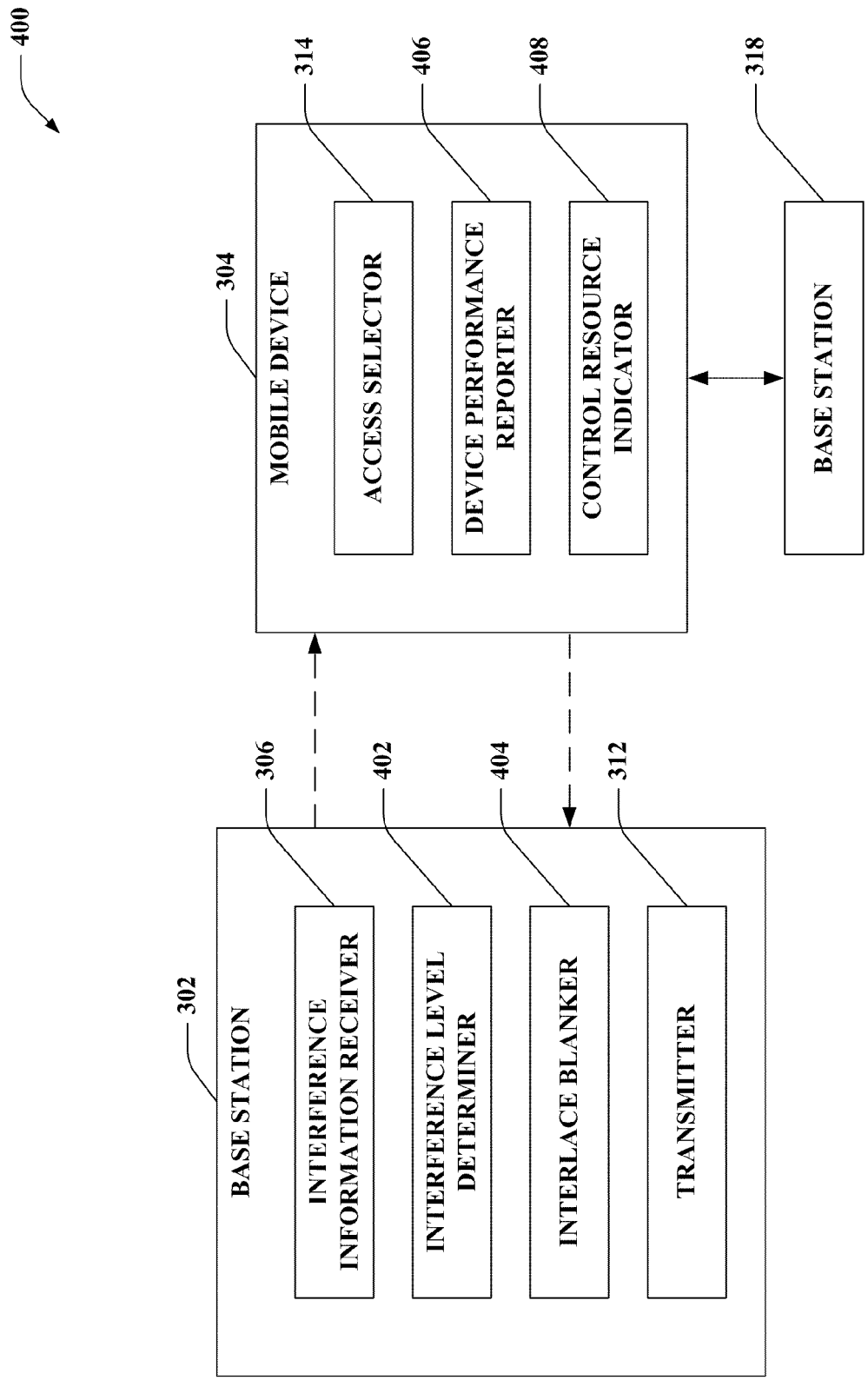
FIG. 4 is an illustration of an example wireless communications system that blanks transmission over subsets of interlaces to mitigate interference to a device.

Turning now to FIG. 4, an example system 400 is illustrated that facilitates blanking a subset of interlaces determined to interfere communications between other devices in a wireless network. System 400 includes a base station 302 that can communicate with a plurality of disparate mobile devices (not shown). The mobile device 304 is communicating with base station 318, which can provide access to a wireless network. Base station 318 can transmit information to mobile device 304 over a forward link channel; further base station 318 can receive information from mobile device 304 over a reverse link channel. Moreover, system 300 can be a MIMO system. Additionally, the system 300 can operate in an OFDMA wireless network (such as 3GPP for example). Also, the components and functionalities shown and described below in the base stations 302 and 318 can be present in one another and/or the mobile device 304 as well and vice versa, in one example; the configuration depicted excludes these components for ease of explanation. Moreover, base station 302 and/or mobile device 304 in FIG. 3 can include the components of base station 302 and mobile device 304 depicted in FIG. 4, and/or vice versa, to facilitate similar functionality such as similar interference reporting not only for interlace blanking, but also for the general channel blanking described in FIG. 3.

Base station 302 includes an interference information receiver 306 that can obtain information related to interference of the base station 302 with other communicating devices (such as mobile device 304 and base station 318), an interference level determiner 402 that discerns whether base station 302 interferes, at or over a threshold level, with devices communicating over a subset of interlaces, an interlace blanker 404 that blanks transmission over the subset of interlaces, and a transmitter 312 that transmits data to other devices with which the base station 302 is communicating. Mobile device 304 includes an access selector 314 that can be used to choose an access point for wireless communications, a device performance reporter 406 that can determine and provide one or more parameters relating to communication performance of the mobile device 304 with one or more base stations, and a control resource indicator 408 that specifies a set of resources over which mobile device 304 transmits control data to one or more base stations.

An interlace, as discussed herein, can relate to a set of periodic subframes. For example, in LTE, transmission bandwidth can be divided in time into units of subframes, which are portions of frequency over time. On reverse link, a packet transmitted in a subframe is retransmitted eight subframes later; on the forward link, a packet transmitted in a subframe is retransmitted at least eight subframes later. Thus, transmission bandwidth in LTE can be divided into interlaces of eight subframes. In this regard, interlace 0 can include subframes 0, 8, 16, . . . ; interlace 1 can include subframes 1, 9, 17 . . . ; etc. In addition, the LTE assignment and acknowledgement timeline is such that control channels (e.g., assignments, acknowledgements, etc.) used to control data transmissions in interlace 0 on the forward link can be confined to forward link interlace 0 and reverse link interlace 4 (and transmissions in interlace 1 can be confined to forward link interlace 1 and reverse link interlace 5, and so on in LTE). Similarly, control channels used to control reverse link data transmission on interlace 4 can be confined to forward link interlace 0, etc. In this regard, base station 302 can blank over a subset of interlaces to minimize effects of blanking on transmission bandwidth of base station 302.

According to an example, mobile device 304 can select base station 318 for initiating wireless communication, using the access selector 314, as described previously. Device performance reporter 406 can determine one or more communication performance metrics related to communicating with base station 318. Device performance reporter 406 can provide this information to base station 302 to facilitate determining actual or potential interference with mobile device 304. Moreover, control resource indicator 408 can notify base station 302 of one or more control resources (e.g., channels or other resource units) and/or a subset of interlaces utilized by mobile device 304 to transmit control data to base station 318.

In one example, interference information receiver 306 can obtain the performance metrics and/or control resource information. Interference level determiner 402 detects whether base station 302 interferes with mobile device 304 and/or base station 318 over the subset of interlaces based at least in part on the performance metrics. For example, device performance reporter 406 can compute relative received relative strength of signals from base station 302, and base station 318, and can provide these measurements to base station 302. Interference information receiver 306 can receive the measurements, and interference level determiner 402 can identify whether the strengths are above or below a threshold difference to discern whether base station 302 interferes at or over a threshold level with mobile device 304/base station 318 communications. In another example, the metrics collected and provided by device performance reporter 406 can relate to a data rate, latency, quality of service (QoS), or other metrics related to communicating with base station 318. Interference level determiner 402 can similarly compare these metrics to threshold levels to determine interference by base station 302 at or over a level.

In yet another example, device performance reporter 406 can determine one or more factors relating to poor performance at mobile device 304, such as data rate limitation caused by a low number of interlaces allocated for control connectivity by base station 318. Similarly, interference information receiver 306 can obtain the factors, and interference level determiner 402 can decide whether base station 302 interferes at or over a threshold level to mobile device 304 communicating with base station 318. In one example, interference level determiner 402 can compare the metrics or factors described above to metrics or factors related to one or more disparate devices (not shown) served by base station 302.

For example, this can include interference level determiner 402 evaluating a bandwidth loss to the one or more disparate devices served by base station 302 resulting from blanking the subset of interlaces to the control connectivity gain to mobile device 304. For example, interference level determiner 402 computes or otherwise estimates an improvement to the metrics received by interference information receiver 306 resulting from the blanking, as described above, in performing the evaluation. As described, the metrics can relate to signal strengths, data rate, latency, QoS, factors relating to poor performance, control connectivity, etc. Thus, a computed improvement to the metrics, for example, can be an estimated improvement in data rate, latency, or QoS caused by blanking. In one example, interference level determiner 402 can discern the level of interference of base station 302 based on ensuring a level of fairness or a minimum operability standard across mobile devices (which can be defined in a specification, configuration, hardcoded at base station 302, etc.). Thus, for example, where base station 302 not blanking over the interlaces would bring mobile device 304 below a level of service, interference level determiner 402 can determine that base station 302 interferes over a threshold level. Similarly, where blanking over the subset of interlaces would lower a service level of a served mobile device, interference level determiner 402 may not determine base station 302 to interfere over a threshold level.

In yet another example, interference level determiner 402 can decide base station 302 interferes at or over a threshold level in only a portion of the subset of interlaces to balance a level of service to mobile device 304 communicating with base station 318 and devices communicating with base station 302. In another example, interference information receiver 306 can receive a notification that it is a dominant interferer of communications between mobile device 304 and base station 318 from mobile device 304, base station 318, a core network, one or more wireless network devices, etc. Moreover, for example, the notification can be received over the air, over a backhaul link, and/or the like. In one example, device performance reporter 406 can provide the metrics to base station 318 (and/or base station 318 can otherwise measure similar metrics, for example based on control data received from mobile device 304), and base station 318 can communicate the metrics to base station 302 over a backhaul link.

In any case, control resource indicator 408 can specify control resources over which it communicates with base station 318 to base station 302, which can include a subset of interlaces utilized for control communications, as described. If base station 302 interferes over a threshold level, which can be determined as described above, interlace blanker 404 can blank transmissions over indicated control resources assigned to mobile device 304 during the subframes in the subset of interlaces. This leaves remaining interlaces free for communication by base station 302 to minimize the effect of the blanking on base station 302 transmission bandwidth.

Figure 5:
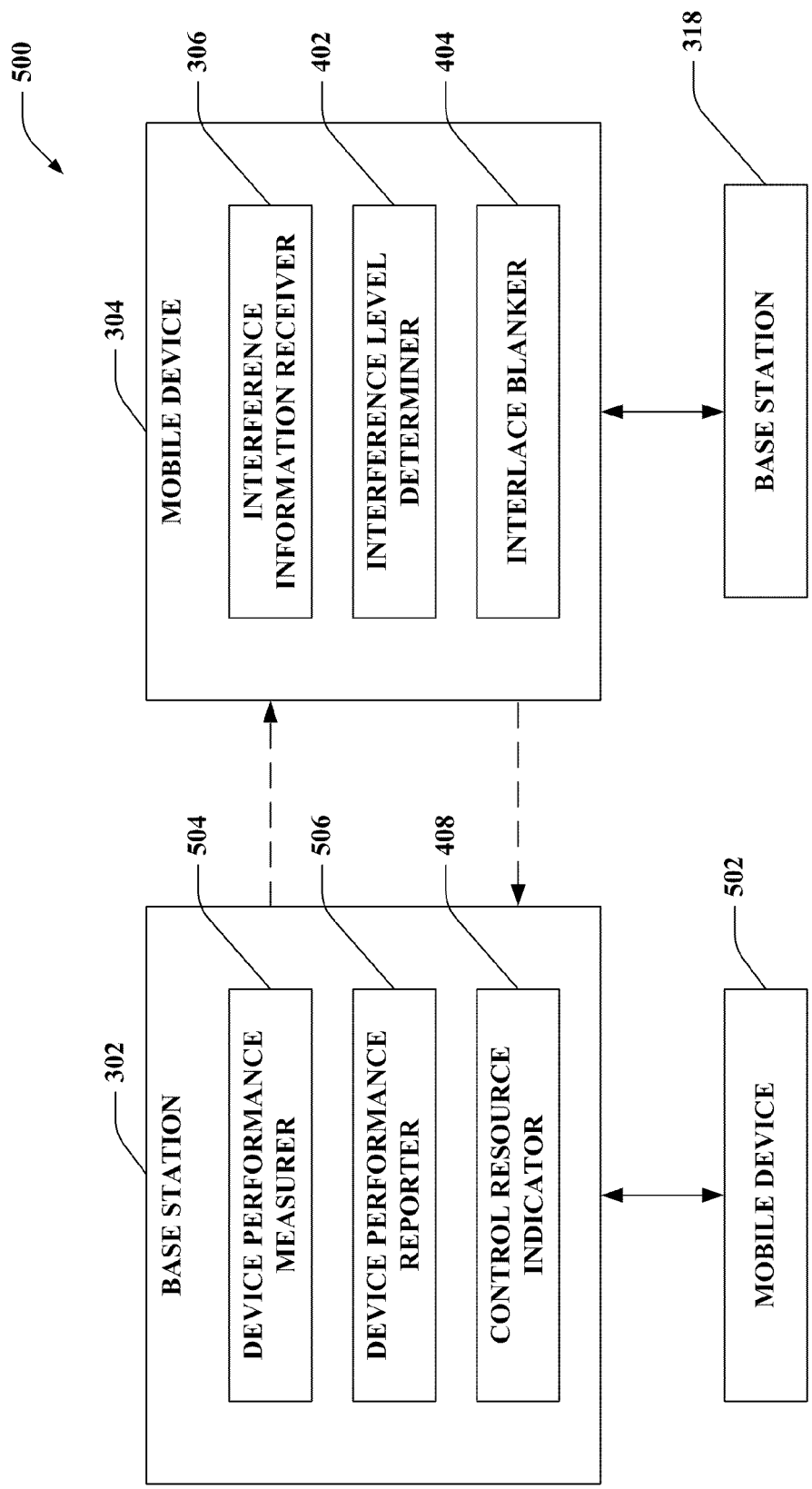
FIG. 5 is an illustration of an example wireless communications system that blanks transmission over a subset of reverse link interlaces to mitigate interference.

Turning now to FIG. 5, an example system 500 is illustrated that facilitates blanking reverse link transmission over a subset of interlaces determined to interfere communications between other devices in a wireless network. System 500 includes a base station 302 that can communicate with mobile device 502 to provide wireless network access thereto. System 500 also includes a mobile device 304 communicating with base station 318, which can similarly provide access to a wireless network. Base stations 302 and 318 can respectively transmit information to mobile devices 502 and 304 over forward link channels; further base stations 302 and 318 can respectively receive information from mobile devices 502 and 304 over reverse link channels. Moreover, system 300 can be a MIMO system. Additionally, the system 300 can operate in an OFDMA wireless network (such as 3GPP for example). Also, the components and functionalities shown and described below in the base stations 302 and 318 can be present in one another and/or the mobile devices 502 and 304 as well and vice versa, in one example; the configuration depicted excludes these components for ease of explanation. Moreover, base station 302 and/or mobile device 304 in FIG. 3 can include the components of base station 302 and mobile device 304 depicted in FIG. 5, and/or vice versa, to facilitate similar functionality such as similar mobile device blanking over not just interlaces, but over general channels or other portions of bandwidth as described in FIG. 3.

Base station 302 includes a device performance measurer 504 that computes or receives metrics related to performance of mobile devices served by base station 302, an device performance reporter 506 that indicates information regarding performance of one or more devices communicating with base station 302, and a control resource indicator 408 that specifies control resources utilized by one or more devices communicating with base station 302. Mobile device 304 includes an interference information receiver 306 that obtains information regarding interference to one or more devices communicating with a neighboring base station, an interference level determiner 402 that discerns whether mobile device 304 interferes with one or more devices communicating with the neighboring base station at or over a threshold level, and an interlace blanker 404 that blanks transmission over one or more subsets of interlaces utilized by one or more devices to communicate with the neighboring base station.

According to an example, device performance measurer 504 can determine performance metrics of mobile device 502 communicating with base station 302. Device performance measurer 504 can compute the metrics based at least in part on control data received from mobile device 502, receiving relative strengths of signals, data rate of the mobile device 502, etc. In another example, device performance measurer 504 can receive the metrics from mobile device 502, a core network, and/or one or more network devices. Device performance reporter 506 can provide the metrics to mobile device 304 to facilitate determining whether mobile device 304 interferes on the reverse link with mobile device 502 to base station 302 communications at or over a threshold level. In this example, interference information receiver 306 can receive the measurements, and interference level determiner 402 can identify whether mobile device 304 interferes at or over a threshold level. Control resource indicator 408 can additionally provide information to mobile device 304 regarding location of control resources utilized by mobile device 502 (e.g., a subset of interlaces, frequencies, related subframes, and/or the like, as described), and interference information receiver 306 can obtain the location information for subsequent blanking.

As described previously, interference level determiner 402 can discern whether mobile device 304 interferes with mobile device 502 communications to base station 302 at or over a threshold level. For example, interference level determines 402 compares a performance improvement of mobile device 502 due to blanking over the control resources and a disparate improvement to mobile device 304 by continuing transmission over the control resources (or, for example, a degradation in performance to mobile device 304 caused by blanking over the control resources). In this regard, device performance measurer 504 can gather metrics such as data rate, latency, quality of service (QoS), control connectivity factors, such as a number or size of resources granted for communicating control data, or other metrics of mobile device 502. Device performance reporter 506 can provide the metrics to mobile device 304. Interference information receiver 306 can obtain the metrics. For example, interference information receiver 306 can be receiving one or more factors relating to data rate, latency, QoS, control connectivity, and/or the like, as described. Interference level determiner 402 can discern whether mobile device 304 interferers at a threshold level based on the mobile device 502 metrics. As described, this can include computing improvement to the metrics based on blanking over the control resources (e.g., over the subset of interlaces) as compared to a degradation in similar metrics of mobile device 304 caused by the blanking (or an improvement to the metrics of mobile device 304 caused by not blanking over the control resources). In another example, as described, the computed metrics can be evaluated according to ensuring a level of fairness or a minimum operability standard for mobile device 304 and/or other mobile devices to determine a level of interference by mobile device 304.

In yet another example, device performance measurer 504 can determine one or more factors relating to poor performance at mobile device 502, such as data rate limitation caused by a low number of interlaces allocated for control connectivity by base station 302. Similarly, device performance reporter 506 can notify mobile device 304, and interference information receiver 306 can obtain, the factors. Interference level determiner 402 can decide whether mobile device 304 interferers at or over a threshold level to mobile device 502 communicating with base station 302 based on the control connectivity factors. As described, this can include comparing the factors to local factors of mobile device 304, such as control connectivity factors including a number or size of a control resource allocation, minimum guaranteed levels related to the factors, etc.

In any case, as described, control resource indicator 408 can notify mobile device 304 of a subset of interlaces utilized for communicating control data by mobile device 502. Interference information receiver 306 can obtain the subset of interlaces. If mobile device 304 interferes at or over a threshold level, interlace blanker 404 can blank transmissions over indicated control resources assigned to mobile device 502 by base station 302 during the subframes in the subset of interlaces. This leaves remaining interlaces of subframes free for communication by mobile device 304 to minimize the effect of the blanking on mobile device 304 transmission bandwidth.

Figure 6:
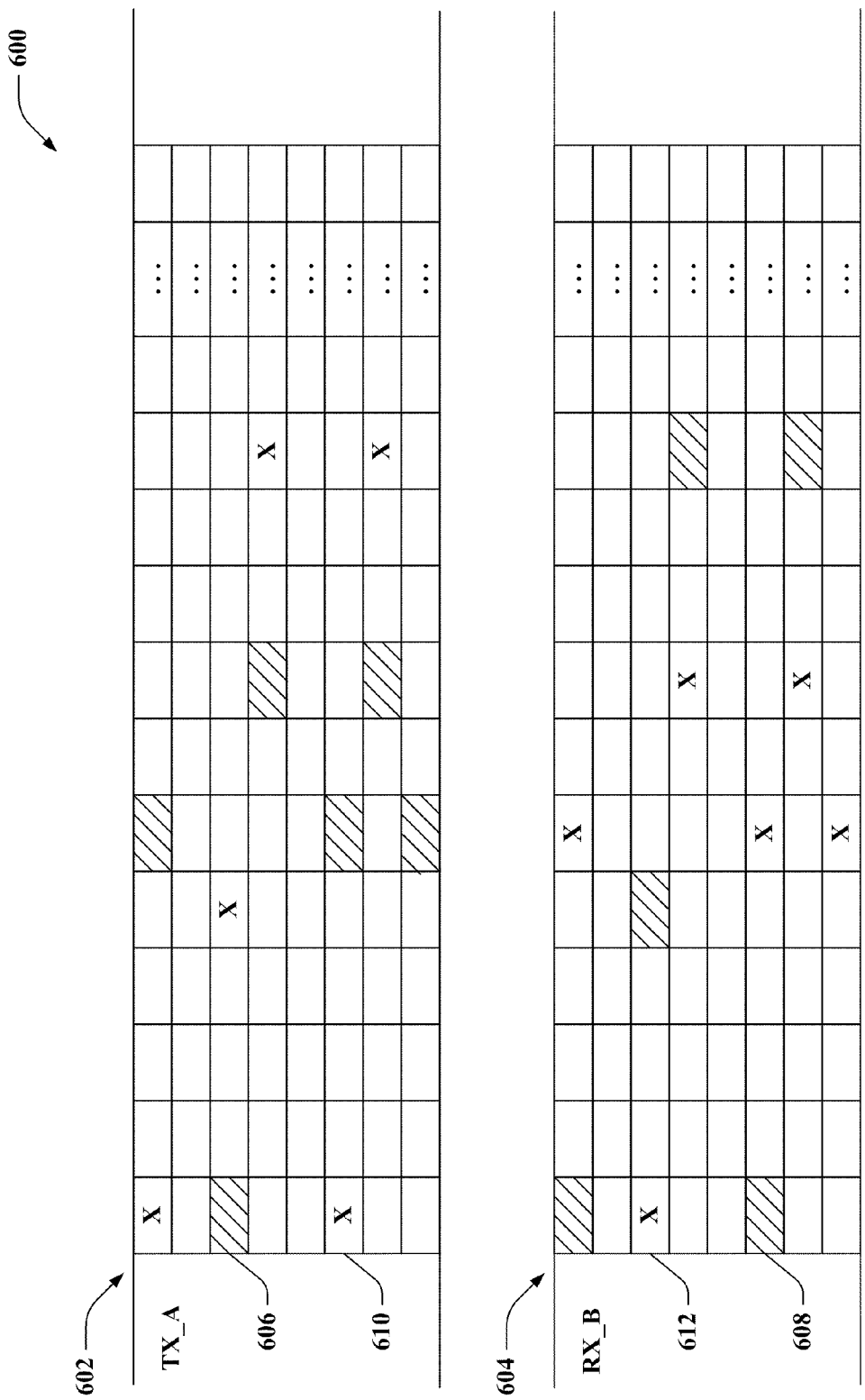
FIG. 6 is an illustration of example bandwidth for devices that interfere with one another.

Now referring to FIG. 6, example portions of bandwidth are shown for a transmitter and receiver in communication with disparate devices. At 602, a portion of bandwidth for a transmitter TX_A is shown, and at 604, a portion of bandwidth over substantially the same time and frequency for receiver RX_B is shown. In one example, the portions can represent OFDM symbols of substantially the same time and frequency. Channels utilized by TX_A and RX_B to communicate with their respective disparate devices can be represented as substantially any subcarriers of the OFDM symbols; lined subcarriers such as 606 and 608 can represent those for which blanking is desired (the subcarriers comprise one or more control channels in one example), and subcarriers having an "X" such as 610 and 612 can represent blanked subcarriers.

In one example, as described previously, TX_A can be communicating data with a disparate receiver, RX_A, and RX_B can be communicating with a disparate transmitter TX_B. As mentioned, however, TX_A can be dominantly interfering with RX_B's communication with TX_B. Thus, using one or more of the techniques described above, RX_B can request that TX_A blank on the desired subcarriers (or channels which can be represented by a number of subcarriers) or vice versa. It is to be appreciated that RX_B and TX_A can reciprocally blank on their desired subcarriers. As depicted, TX_A can request RX_B to blank on subcarrier 606, which it does at 612 and RX_B can request TX_A to blank on subcarrier 608, which it does at 610, and so on. In this regard, TX_A and RX_B can communicate with their respective disparate devices without interfering with one another. Additionally, as mentioned, the subcarriers on which no blanking occurs can be transmitted with higher power to compensate for loss in bandwidth due to the blanking in one example. Moreover, the blanking can include removing substantially all power from the subcarrier or reducing the power according to a determined interference level as described supra.

Figure 7:
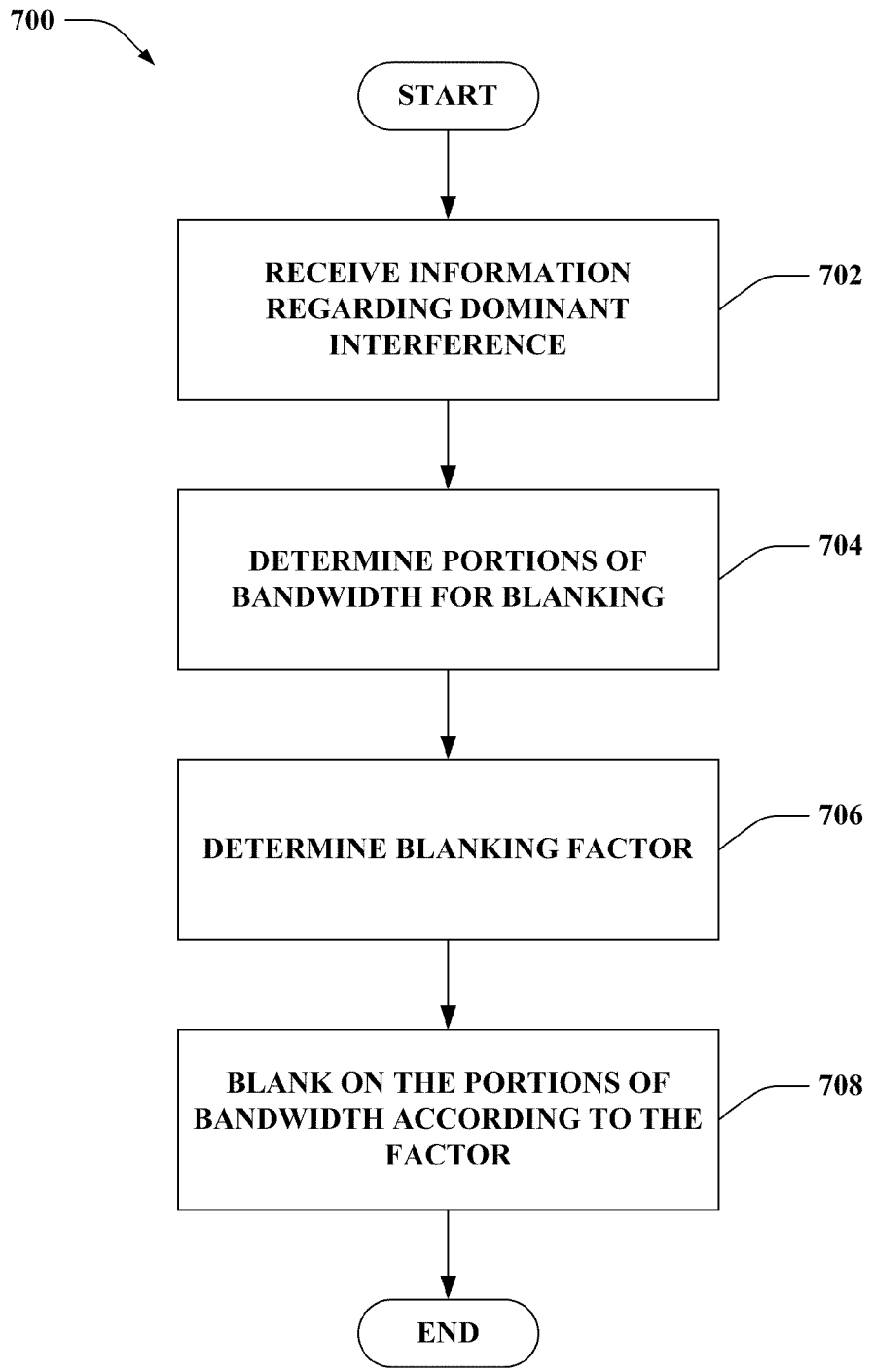
FIG. 7 is an illustration of an example methodology that facilitates blanking on one or more portions of bandwidth.
Figure 8:
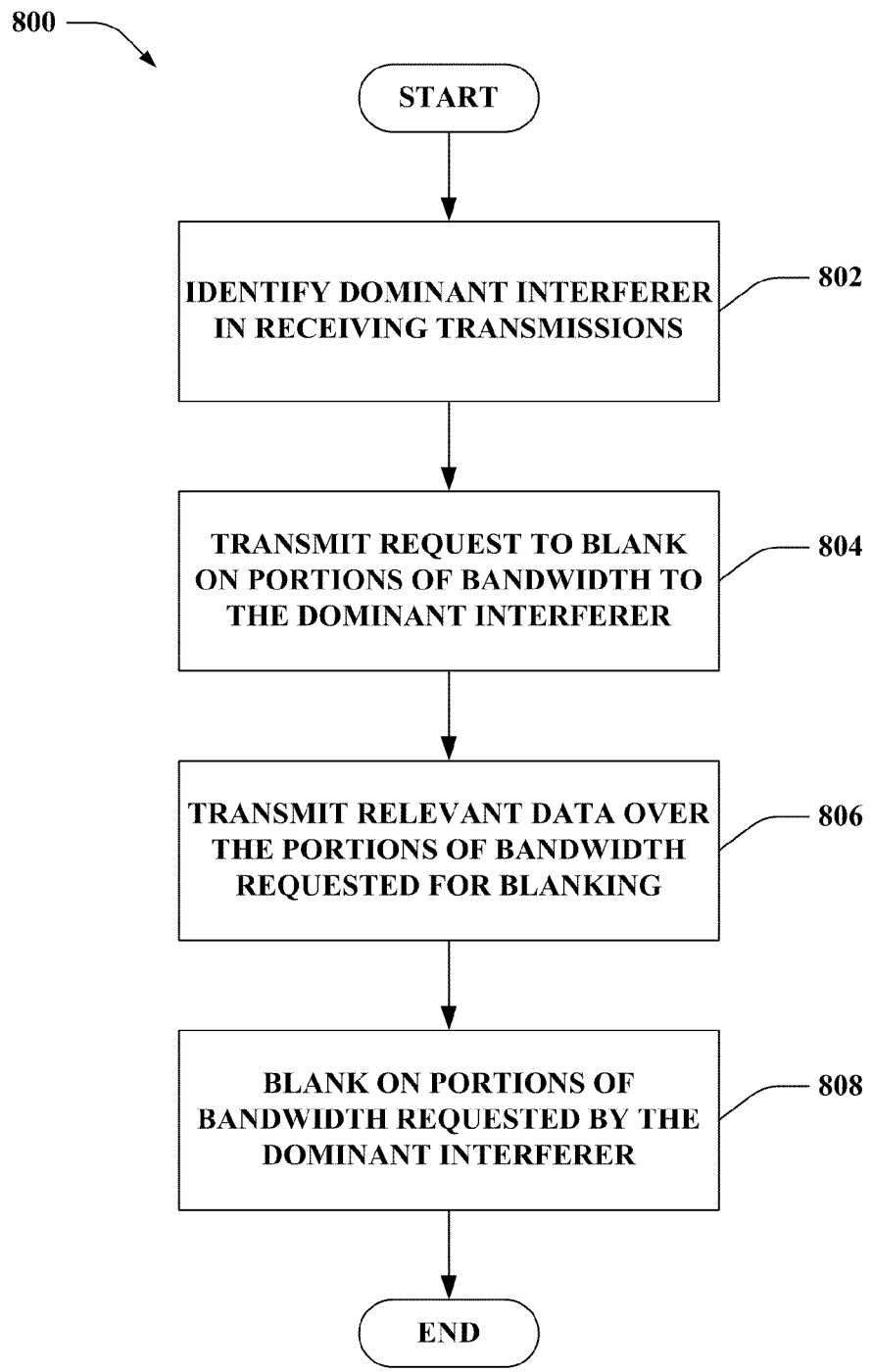
FIG. 8 is an illustration of an example methodology that facilitates requesting blanking over one or more portions of bandwidth.
Figure 9:
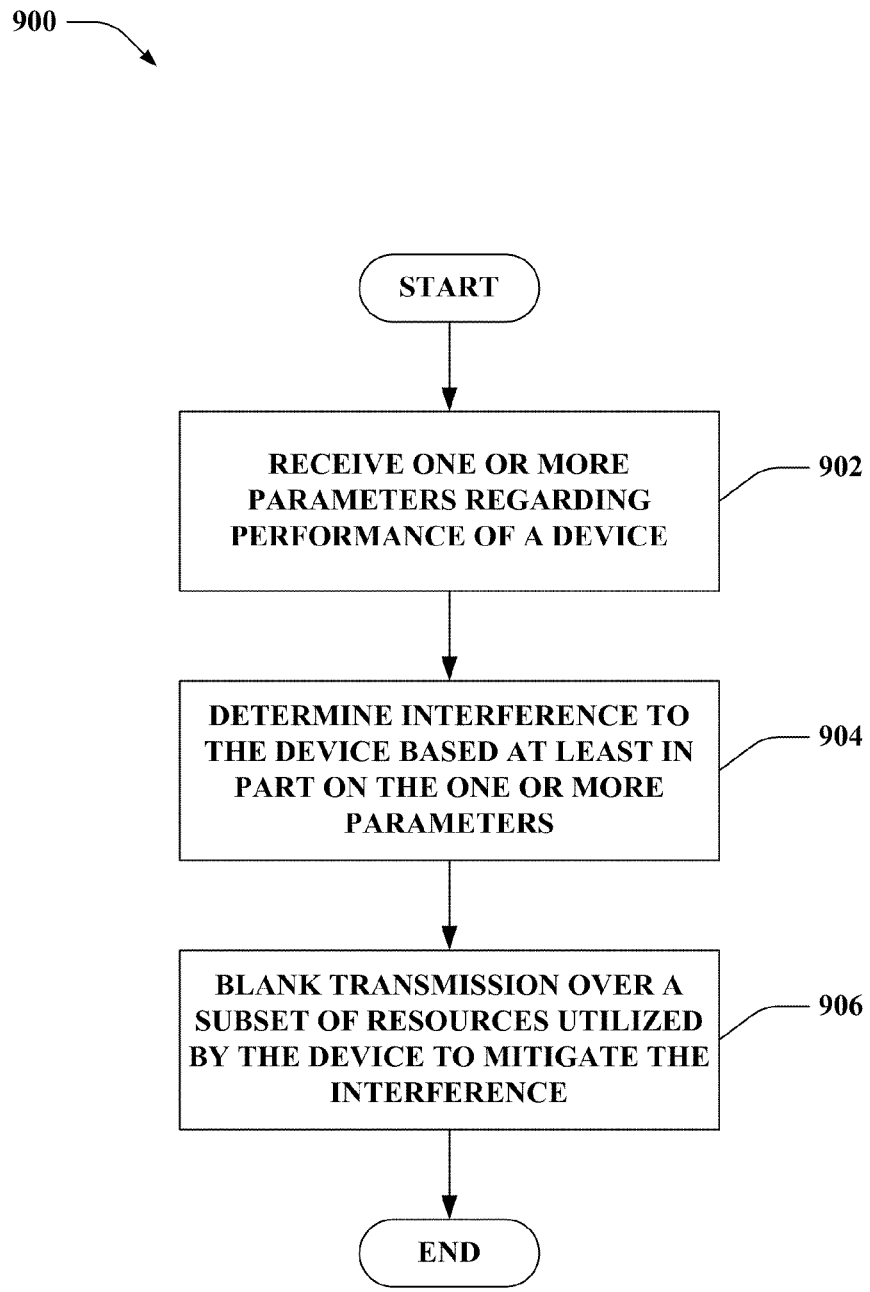
FIG. 9 is an illustration of an example methodology that facilitates blanking transmission over a subset of interlaces utilized by a device for communication in a wireless network.

Referring to FIGS. 7-9, methodologies relating to blanking on portions of bandwidth that are interfered are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 7, illustrated is an example methodology 700 that facilitates blanking on portions of bandwidth to mitigate interference in communications between disparate devices. At 702, information is received regarding dominant interference. For example, the information can be received by a number of devices or inferred based on numerous factors, including transmitted preambles as described previously. The information can comprise portions of bandwidth on which dominant interference occurs such that disparate devices cannot effectively communicate with one another. At 704, portions of bandwidth can be determined for blanking. For example, the portions can be requested from disparate devices as part of the information regarding dominant interference; the determined portions can be a subset of those requested. In one example, the requested portions can be specified as one or more portions for every given time period (such as a frame or OFDM symbol), and the determined portions can be over a subset of the time periods. Additionally or alternatively, the portions for blanking can be inferred from the dominant interference information.

At 706, a blanking factor can be determined; the blanking factor represents the extent to which power is to be removed from the blanked portions. For example, the blanking factor can indicate that substantially all power is to be removed from the portions of bandwidth; alternatively, a portion of the power can be removed. In one example, as described previously, information can be received or inferred regarding an interference level. Using this information, the blanking factor can be set to allow the interfered devices to effectively communicate without removing all power during blanking. At 708, the portions of bandwidth can be blanked according to the determined factor. It is to be appreciated that the blanking, in some cases, can be received as a deep fade rather than no signal. In this regard, the blanked communications can still be important though the SNR is not as good as other transmissions.

Now referring to FIG. 8, an example methodology 800 that facilitates requesting blanking on portions of bandwidth from a dominant interferer is illustrated. At 802, a dominant interferer in receiving transmissions is identified. For example, communications can occur with an access point that may not be the most geographically desirable or have the most desirable SNR as compared to other access points. However, communication can be desired with the access point to utilize services associated therewith, for example. Thus, there can be a device (e.g., that with optimal SNR or geographical desirability) dominantly interfering with communications. At 804, a request is transmitted to the dominant interferer to blank on certain portions of bandwidth. As described, the portions can be logical communications channels, in one example, such as one or more OFDM symbols. By requesting the blanking, more reliable communication can be attained over the portions of bandwidth.

At 806, relevant data can be transmitted over the portions of bandwidth requested for blanking. In one example, the relevant data can be data that is critical to effective communication such as control data (e.g., channel quality information and/or acknowledgement data). Assuming that the request for blanking was successful and the dominant interferer has lowered power for the requested portions of data, the relevant data can be communicated without substantial interference. At 808, portions of bandwidth can be blanked as requested by the dominant interferer to reciprocate the blanking by the dominant interferer. In this regard, the dominant interferer can additionally enjoy lowered interference on certain portions of bandwidth or channels for effective communication with one or more devices.

Turning to FIG. 9, an example methodology 900 is illustrated that facilitates blanking transmission over a subset of interlaces to mitigate interference to devices communicating in a wireless network. At 902, one or more parameters regarding performance of a device can be received. As described, the parameters can relate to communications with a base station and can include metrics such as data rate, latency, QoS, strengths of signals from a serving base station and neighboring base stations, control connectivity, factors related to poor performance, and/or the like. Moreover, the one or more parameters can be received from the device, from a base station serving the device, from one or more disparate network devices, and/or the like, as described. At 904, interference can be determined to the device based at least in part on the one or more parameters. Thus, for example, where the parameters are below a threshold level, the interference can be determined. As described previously, interference can be determined from a variety of additional or alternative factors, such as computing an improvement to the parameters based on blanking over interfered resources (e.g., subsets of interlaces), comparing the parameters and/or the improved parameter computations to similar local parameters, and/or the like. At 906, transmission can be blanked over a subset of resources utilized by the device to mitigate the interference. In one example, an indication of the subset of resources can be received from the device or a related base station in a disparate communication. Moreover, the subset of resources can relate to a subset of subframes, a subset of interlaces defined by periodic subframes, as described, a subset of carriers, and/or the like.

It will be appreciated that, in accordance with one or more aspects described herein, inferences can be made regarding detecting interference by an interfered device and/or from the dominant interferer as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to being a dominant interferer, the extent to which the interference is prohibiting communication between disparate devices, portions of bandwidth to blank based on activity of an interfered device, determining a blanking factor, determining channels on which power can be increased to compensate for the blanking, likelihood of reciprocal blanking from one or more devices, and/or the like.

Figure 10:
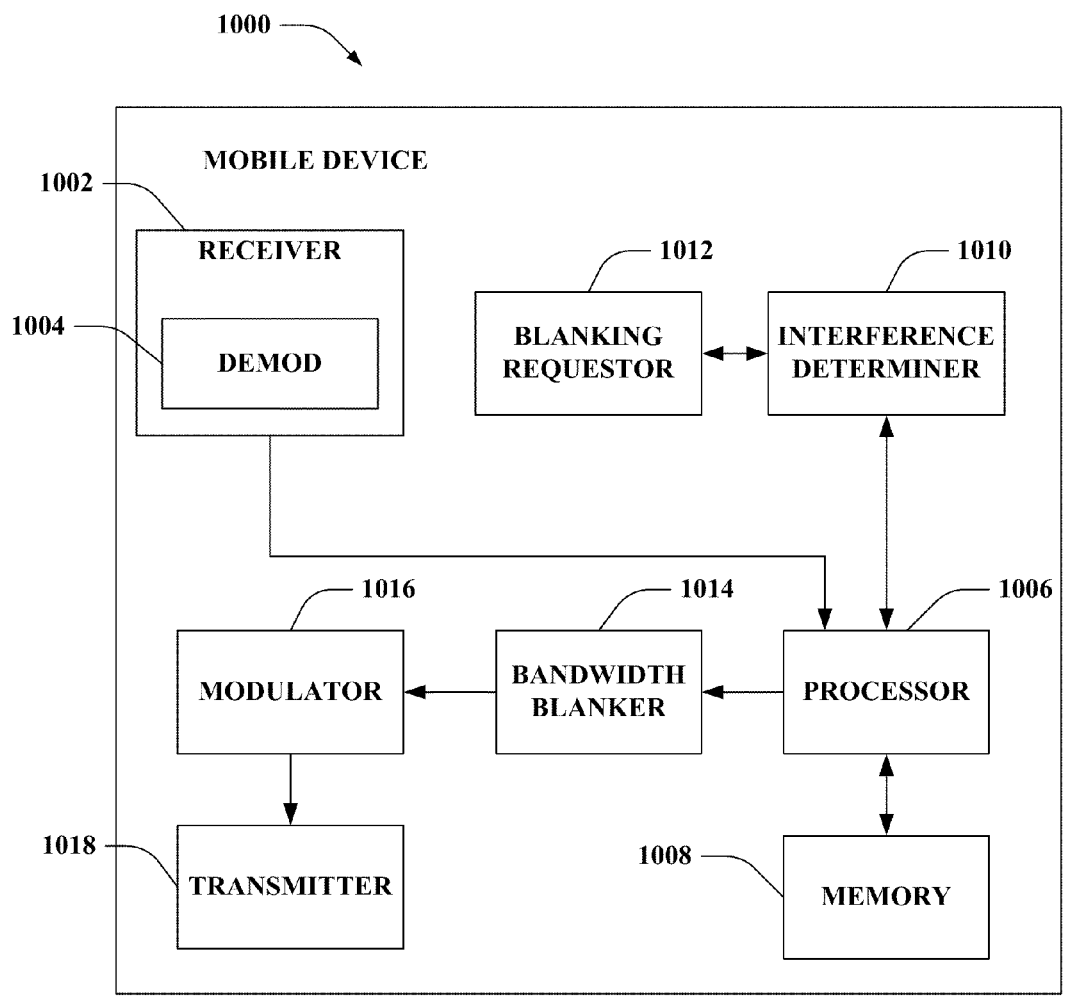
FIG. 10 is an illustration of an example mobile device that facilitates requesting blanking on one or more portions of bandwidth.

FIG. 10 is an illustration of a mobile device 1000 that facilitates requesting blanking on highly interfered portions of bandwidth and reciprocally blanking bandwidth for the dominant interferer. Mobile device 1000 comprises a receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1018, a processor that controls one or more components of mobile device 1000, and/or a processor that both analyzes information received by receiver 1002, generates information for transmission by transmitter 1018, and controls one or more components of mobile device 1000.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 can further be operatively coupled to an interference determiner 1010 that can detect the presence and/or extent of interference of communication with an access point by one or more disparate devices or access points. The detected interference can prevent the mobile device 1000 from effectively transmitting certain relevant communication data, such as control data, to a disparate device or access point. A blanking requestor 1012 can also be operatively coupled to the processor 1006 and can be utilized to transmit requests to one or more interfering devices requesting blanking on portions of bandwidth desired by the mobile device 1000 to transmit the relevant communication data. If the blanking request is satisfied, the mobile device 1000 can transmit the relevant data over the bandwidth without interference from a dominantly interfering device.

Additionally, the processor 1006 can be operatively coupled to a bandwidth blanker 1014 that can blank on bandwidth as requested by one or more disparate devices. This can occur, for example, where the mobile device 1000 is a dominant interferer to communication between disparate devices. Moreover, the bandwidth blanker 1014 can be used to reciprocally blank bandwidth for the dominant interferer to communicate relevant data to one or more disparate devices. Mobile device 1000 still further comprises a modulator 1016 and transmitter 1018 that respectively modulate and transmit signals to, for instance, a base station, another mobile device, etc. Although depicted as being separate from the processor 1006, it is to be appreciated that the interference determiner 1010, blanking requestor 1012, bandwidth blanker 1014, demodulator 1004, and/or modulator 1016 can be part of the processor 1006 or multiple processors (not shown).

Figure 11:
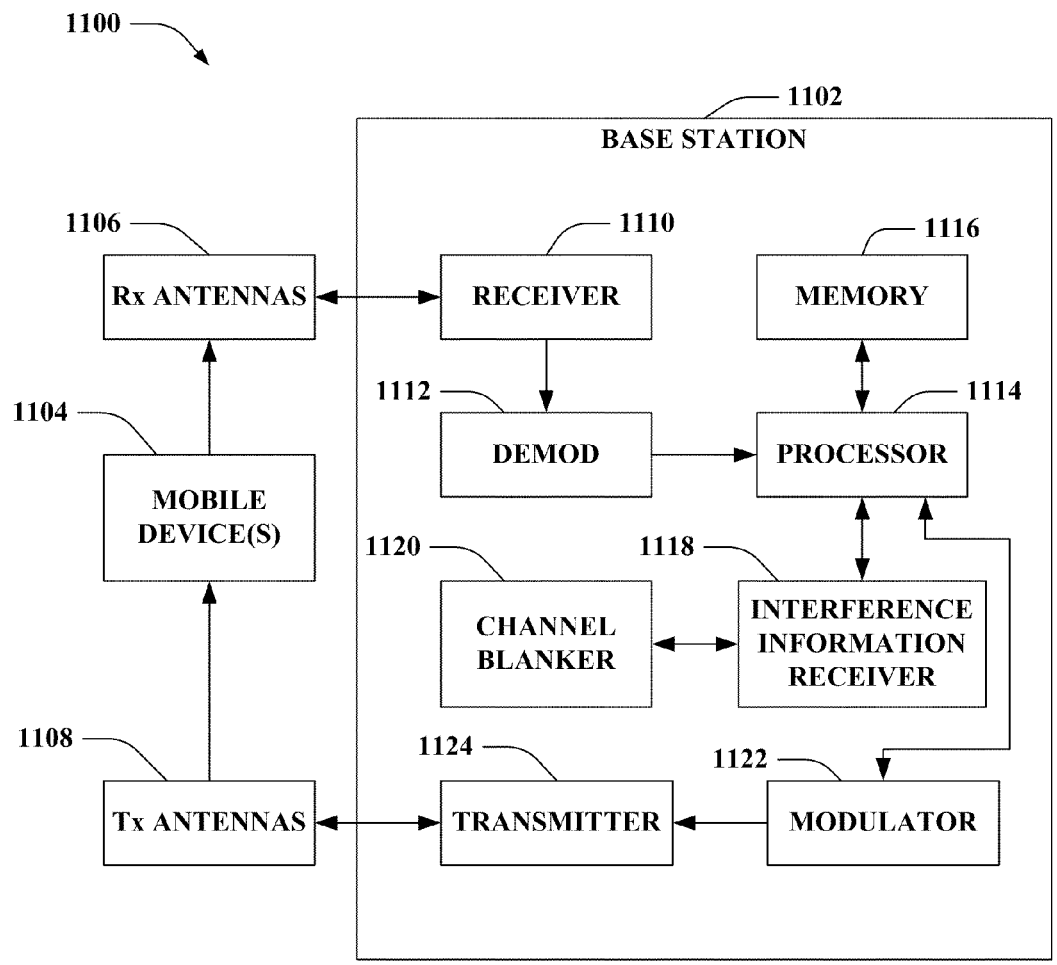
FIG. 11 is an illustration of an example system that facilitates blanking on one or more portions of bandwidth.

FIG. 11 is an illustration of a system 1100 that facilitates blanking on portions of bandwidth to mitigate dominant interference on communications between disparate devices. The system 1100 comprises a base station 1102 (e.g., access point, . . . ) with a receiver 1110 that receives signal(s) from one or more mobile devices 1104 through a plurality of receive antennas 1106, and a transmitter 1124 that transmits to the one or more mobile devices 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein. Processor 1114 is further coupled to an interference information receiver 1118 that can receive information related to interference of the base station 1102 with communications of one or more devices (such as mobile devices 1104) and a channel blanker 1120 that can blank portions of bandwidth (such as one or more channels made up of one or more subcarriers) to allow the interfered device to transmit desired data.

For instance, the interference information receiver 1118 can determine existence of interference from the base station 1102 by receiving explicit information (or blanking requests) or inferring such, for example, by estimating path loss from a preamble transmitted by one or more devices (e.g., mobile devices 1104). The interference information receiver 1118 can also receive or infer information related to specific portions of bandwidth for which the interference is more problematic than others. Using this information, the channel blanker 1120 can blank transmission power on one or more channels to reduce the effect of the interference on disparate communications between disparate devices (e.g., mobile devices 1104 and/or other devices). The channel blanker 1120 can blank by at least one of removing substantially all power from the transmitter 1124 for a specified channel or related subcarrier(s) and/or by reducing power sufficiently to allow the communication between the disparate devices. Furthermore, although depicted as being separate from the processor 1114, it is to be appreciated that the interference information receiver 1118, channel blanker 1120, demodulator 1112, and/or modulator 1122 can be part of the processor 1114 or multiple processors (not shown).

Figure 12:
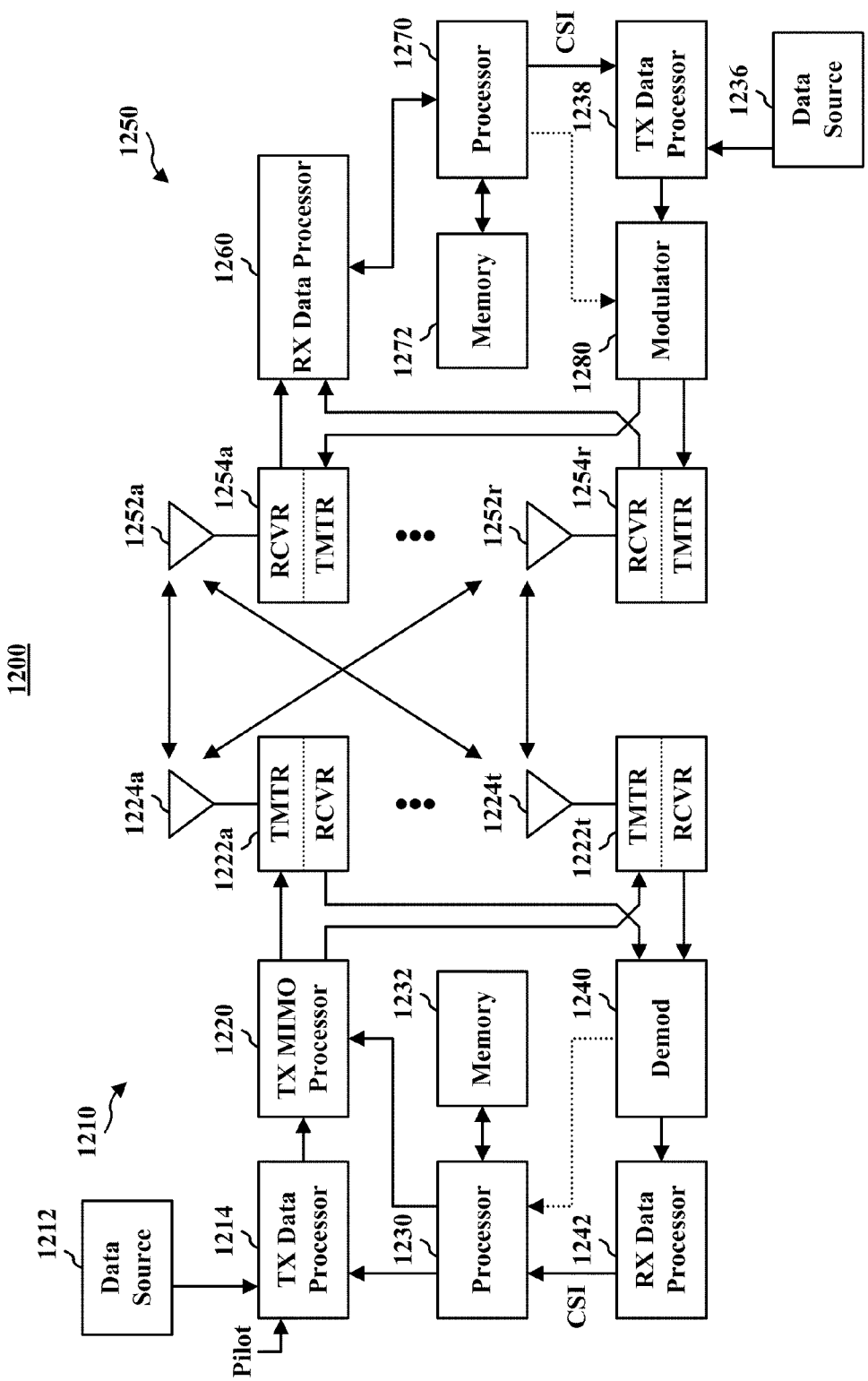
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-5 and 10-11), techniques/configurations (FIG. 6) and/or methods (FIGS. 7-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
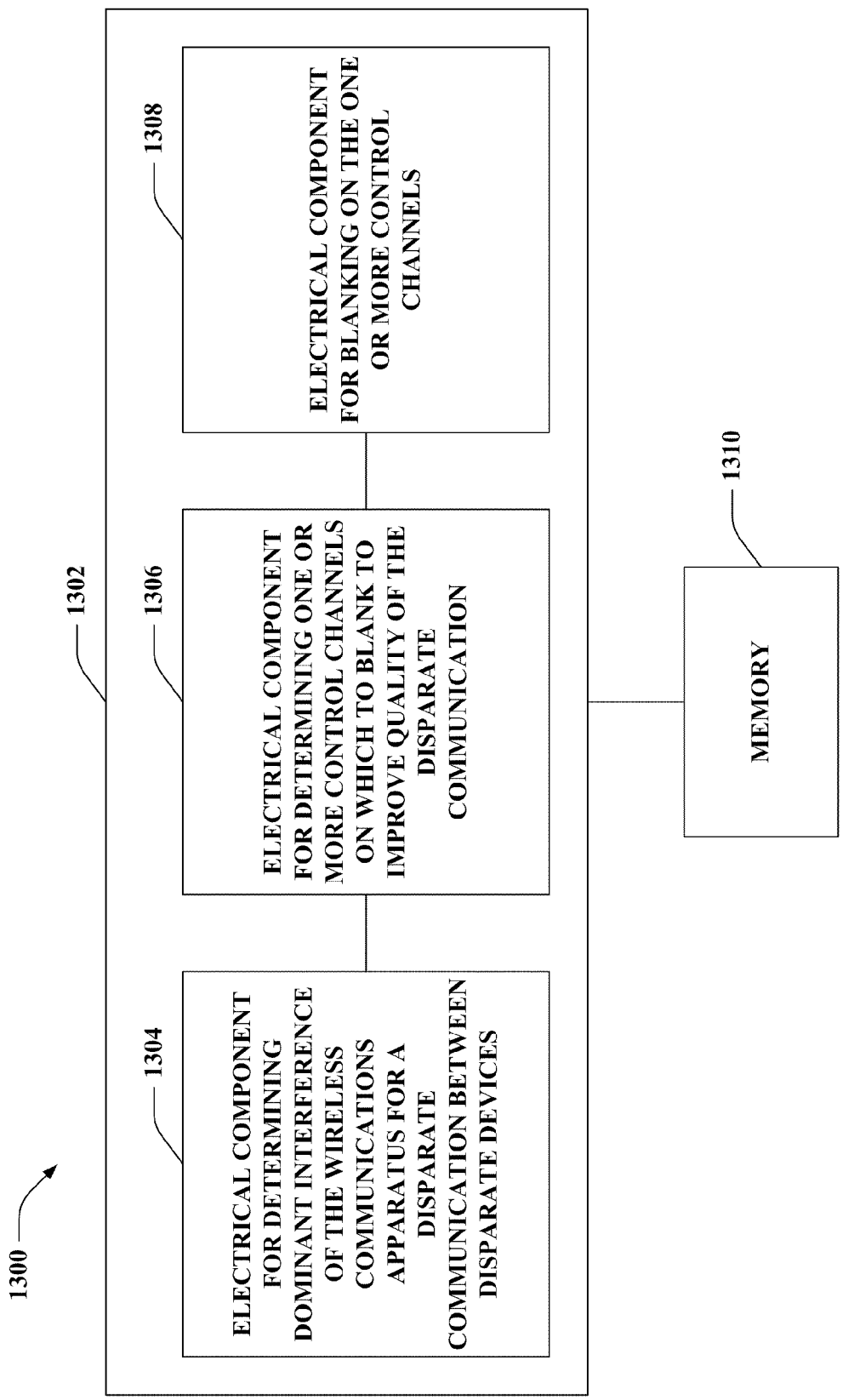
FIG. 13 is an illustration of an example system that blanks on one or more portions of bandwidth.

With reference to FIG. 13, illustrated is a system 1300 that blanks on one or more portions of bandwidth to mitigate dominant interference thereon. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for determining dominant interference of the wireless communications apparatus for a disparate communication between disparate devices 1304. For example, the interference can be determined by receiving information related thereto, discerning the interference, which can be based at least in part on measuring a path loss from a preamble of one or more of the disparate devices, and the like. Additionally, a level of interference can be measured to allow for partial blanking on one or more portions of bandwidth. Further, logical grouping 1302 can comprise an electrical component for determining one or more control channels on which to blank to improve quality of the disparate communication 1306. In one example, the control channels can be defined by a number of subcarriers of one or more OFDM symbols used for communication. By blanking on the portions, the devices that are being interfered can ensure quality transmission with each other since the dominant interferer is no longer interfering on the portions. Moreover, logical grouping 1302 can comprise an electrical component for blanking on the one or more control channels 1308. Thus, the channels can actually be blanked to facilitate reliable communication between the devices over the portions of bandwidth that make up the control channels. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
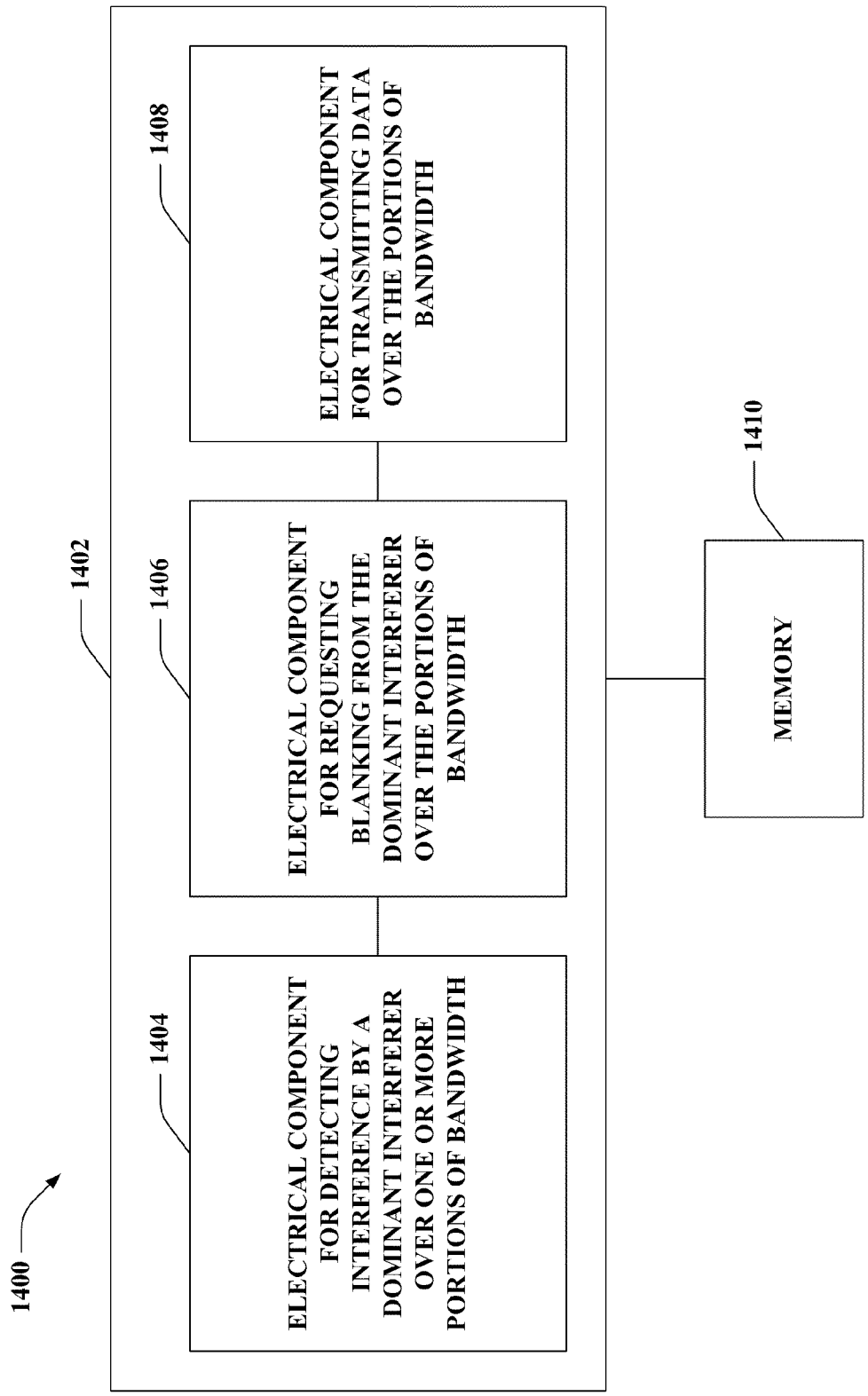
FIG. 14 is an illustration of an example system that requests blanking and transmits data over portions of bandwidth.

Turning to FIG. 14, illustrated is a system 1400 that requests blanking on one or more portions of bandwidth to allow non-interfered transmission of data over the portions of bandwidth. System 1400 can reside within a base station, mobile device, etc., for instance. As depicted, system 1400 includes functional blocks that can represent functions implemented by a processor, software, or combination thereof (e.g., firmware). System 1400 includes a logical grouping 1402 of electrical components that facilitate requesting the blanking and transmitting data. Logical grouping 1402 can include an electrical component for detecting interference by a dominant interferer over one or more portions of bandwidth 1404. The interference can be detected based on an SNR, control data, etc., and the portions of bandwidth can be those used for transmitting critical data, such as control data, for example. Moreover, logical grouping 1402 can include an electrical component for requesting blanking from the dominant interferer over the portions of bandwidth 1406. In this regard, if the blanking request is granted (in part or in full), there can be less interference over the portions of bandwidth such to improve quality of transmission over the portions. Further, logical grouping 1402 can comprise an electrical component for transmitting data over the portions of bandwidth 1408. Additionally, system 1400 can include a memory 1410 that retains instructions for executing functions associated with electrical components 1404, 1406, and 1408. While shown as being external to memory 1410, it is to be understood that electrical components 1404, 1406, and 1408 can exist within memory 1410.

Figure 15:
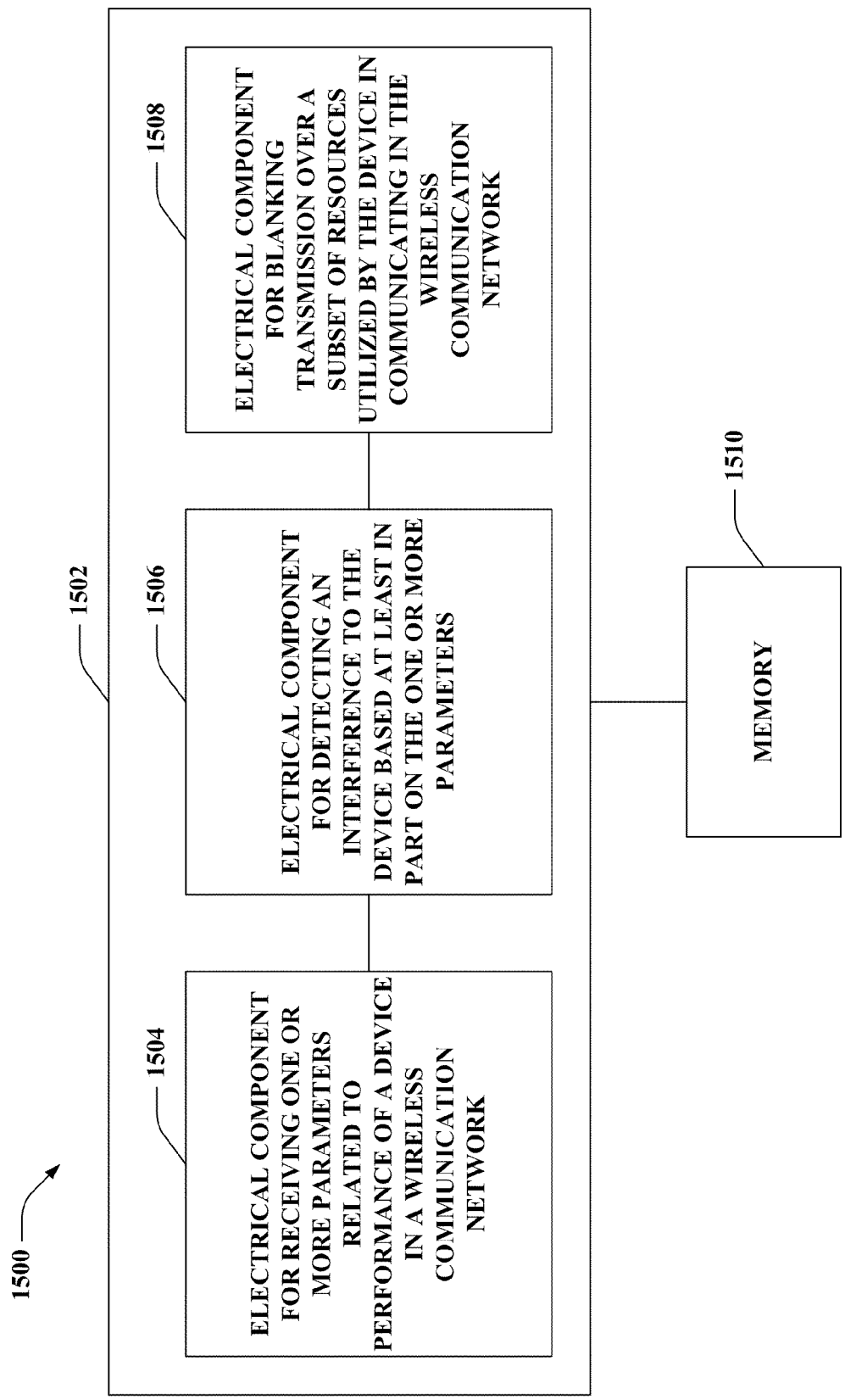
FIG. 15 is an illustration of an example system that blanks transmission over one or more subsets of interlaces.

With reference to FIG. 15, illustrated is a system 1500 that blanks transmission over one or more subsets of interlaces to mitigate interference thereover. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware).

System 1500 includes a logical grouping 1502 of electrical components that can act in conjunction. For instance, logical grouping 1502 can include an electrical component for receiving one or more parameters related to performance of a device in a wireless communication network 1504. As described, the one or more parameters can relate to relative strengths of signals from system 1500 and/or one or more base stations received at the device, a data rate, latency, or QoS of the device related to communicating with a base station, one or more control connectivity factors, and/or the like. Electrical component 1504 can receive the one or more parameters from the device, base station, one or more network devices, etc., as described. Further, logical grouping 1502 can comprise an electrical component for detecting an interference to the device based at least in part on the one or more parameters 1506. In one example, electrical component 1506 can compute an improvement to the one or more parameters that would result from blanking transmission to mitigate interference with the device. In addition, electrical component 1506 can compare the improvement to a disparate improvement of one or more local parameters of system 1500 that would result from not blanking transmission (such as an increase in bandwidth). In another example, electrical component 1506 can determine the interference based at least in part on comparing the one or more parameters to threshold levels (e.g., a minimum data rate, maximum latency, QoS, and/or the like). In yet another example, electrical component 1506 can receive an indication of interference from one or more network devices. Moreover, logical grouping 1502 can comprise an electrical component for blanking transmission over a subset of resources utilized by the device in communicating in the wireless communication network 1508. This can mitigate interference with the device over the subset of resources, as described, which can be a subset of subframes, a subset of interlaces, and/or the like. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving one or more parameters from a base station regarding performance of a device in a wireless communication network;
   determining an interference to the device based at least in part on the one or more parameters, wherein determining the interference to the device includes determining an improvement to the one or more parameters regarding the performance of the device due to blanking transmission over a subset of resources; and
   blanking transmission over the subset of resources utilized by the device to communicate with the base station based on the determined improvement, to mitigate the interference to the device on the subset of resources.

2. The method of claim 1, further comprising receiving an indication of the subset of resources.

3. The method of claim 1, wherein the blanking transmission over the subset of resources includes blanking transmission over a subset of subframes or a subset of carriers.

4. The method of claim 3, wherein the blanking transmission over the subset of subframes includes blanking transmission over a subset of interlaces that represent periodic communication subframes.

5. The method of claim 1, wherein the blanking transmission over the subset of resources includes blanking reverse link transmission over the subset of resources.

6. The method of claim 1, wherein the determining the interference to the device further includes evaluating the improvement to the one or more parameters based on the blanking transmission over the subset of resources to a disparate improvement of one or more local parameters based on continuing transmission over the subset of resources.

7. The method of claim 1, wherein the receiving one or more parameters regarding performance of the device includes receiving a data rate, latency, or quality of service of the device communicating with the base station.

8. The method of claim 1, wherein the receiving one or more parameters regarding performance of the device includes receiving relative strengths of signals received at the device from the base station and a neighboring base station.

9. The method of claim 1, wherein the receiving one or more parameters regarding performance of the device includes receiving one or more factors related to control connectivity of the device.

10. The method of claim 1, wherein the determining the interference to the device includes receiving an indication of interference from the device or one or more disparate devices or base stations in a wireless network.

11. The method of claim 1, wherein the subset of resources relate to control or data channels utilized by the device in communicating with the base station.

12. A wireless communications apparatus, comprising:
    at least one processor configured to:
      obtain one or more parameters from a base station related to performance of a device in communicating with the base station;
      detect interference to the device by the wireless communications apparatus based at least in part on the one or more parameters, wherein the at least one processor detects interference to the device based at least in part on determining an improvement to the one or more parameters related to the performance of the device due to blanking transmission over a subset of resources; and
      blank transmission over the subset of resources utilized by the device to communicate with the base station based on the determined improvement, to mitigate interference over the subset of resources; and
    a memory coupled to the at least one processor.

13. The wireless communications apparatus of claim 12, wherein the at least one processor is further configured to receive an indication of the subset of resources utilized by the device to communicate with the base station.

14. The wireless communications apparatus of claim 12, wherein the subset of resources includes a subset of subframes or a subset of carriers.

15. The wireless communications apparatus of claim 12, wherein the subset of subframes includes a subset of interlaces defined over a set of periodic subframes.

16. The wireless communications apparatus of claim 12, wherein the at least one processor detects interference to the device further based at least in part on comparing the improvement to a disparate improvement of one or more local parameters related to communications of the wireless communications apparatus based on continuing transmission over the subset of resources.

17. The wireless communications apparatus of claim 12, wherein the one or more parameters relates to relative strengths of signals received at the device from the base station and a neighboring base station.

18. The wireless communications apparatus of claim 12, wherein the one or more parameters includes one or more factors related to control connectivity of the device.

19. The wireless communications apparatus of claim 18, wherein the at least one processor detects interference to the device based at least in part on comparing the control connectivity to a connectivity of the wireless communications apparatus and the base station or the device communicating therewith.

20. The wireless communications apparatus of claim 12, wherein the at least one processor detects interference to the device based at least in part on receiving an indication of interference from the device or one or more disparate devices or base stations in a wireless network.

21. An apparatus, comprising:
    means for receiving one or more parameters from a base station related to performance of a device in a wireless communication network;
    means for detecting an interference to the device based at least in part on the one or more parameters, wherein the means for detecting the interference determines an improvement to the one or more parameters regarding the performance of the device due to blanking transmission over a subset of resources; and
    means for blanking transmission over the subset of resources utilized by the device in communicating with the base station based on the determined improvement, to mitigate the interference to the device on the subset of resources in the wireless communication network.

22. The apparatus of claim 21, wherein the means for receiving the one or more parameters receives an indication of the subset of resources.

23. The apparatus of claim 21, wherein the subset of resources includes a subset of subframes or a subset of carriers.

24. The apparatus of claim 23, wherein the subset of subframes includes a subset of interlaces defined by a set of periodic subframes.

25. The apparatus of claim 21, wherein the means for blanking transmission blanks reverse link transmission over the subset of resources.

26. The apparatus of claim 21, wherein the means for detecting the interference compares the improvement to the one or more parameters to a disparate improvement of one or more local parameters of the apparatus based on continuing transmission over the subset of resources.

27. The apparatus of claim 21, wherein the one or more parameters include a data rate, latency, or quality of service related to communication between the device and the base station.

28. The apparatus of claim 21, wherein the one or more parameters include relative strength of signals received at the device from the base station communicating with the device and a neighboring base station.

29. The apparatus of claim 21, wherein the one or more parameters are related to control connectivity of the device with the base station.

30. The apparatus of claim 21, wherein the means for detecting the interference receives an indication of the interference from one or more devices in the wireless communication network.

31. A computer program product, comprising:
a non-transitory computer-readable medium comprising:
code for causing at least one computer to receive from a base station one or more parameters regarding performance of a device in a wireless communication network;
code for causing the at least one computer to determine an interference to the device based at least in part on the one or more parameters, wherein the code for causing the at least one computer to determine the interference includes code for causing the at least one computer to determine an improvement to the one or more parameters regarding the performance of the device due to blanking transmission over a subset of resources; and
code for causing the at least one computer to blank transmission over the subset of resources utilized by the device to communicate with the base station based on the determined improvement, to mitigate the interference to the device on the subset of resources.

32. The computer program product of claim 31, wherein the computer-readable medium further comprises code for causing the at least one computer to receive an indication of the subset of resources, wherein the subset of resources relate to periodic communication subframes.

33. The computer program product of claim 31, wherein the subset of resources includes a subset of subframes or a subset of carriers.

34. The computer program product of claim 33, wherein the subset of subframes includes a subset of interlaces that includes a set of periodic subframes.

35. The computer program product of claim 31, wherein the computer-readable medium further comprises code for causing the at least one computer to compare the improvement to the one or more parameters to a disparate improvement of one or more local parameters based on continuing transmission over the subset of resources to determine the interference.

36. The computer program product of claim 31, wherein the one or more parameters include a data rate, latency, or quality of service of the device communicating with the base station.

37. The computer program product of claim 31, wherein the one or more parameters include relative strengths of signals received at the device from the base station and a neighboring base station.

38. The computer program product of claim 31, wherein the one or more parameters are related to control connectivity of the device with the base station.

39. An apparatus, comprising:
an interference information receiver that obtains one or more parameters from a base station related to performance of a device in a wireless communication network;
an interference level determiner that discerns an interference to the device based at least in part on the one or more parameters, wherein the interference level determiner determines an improvement to the one or more parameters regarding the performance of the device due to blanking transmission over a subset of resources; and
an interlace blanker that blanks transmission over the subset of resources utilized by the device in communicating with the base station based on the determined improvement, to mitigate the interference to the device on the subset of resources in the wireless communication network.

40. The apparatus of claim 39, wherein the interference information receiver obtains an indication of the subset of resources.

41. The apparatus of claim 39, wherein the subset of resources includes a subset of subframes or a subset of carriers.

42. The apparatus of claim 41, wherein the subset of subframes includes a subset of interlaces.

43. The apparatus of claim 31, wherein the interference level determiner compares the improvement to the one or more parameters to a disparate improvement of one or more local parameters of the apparatus based on continuing transmission over the subset of resources.

44. The apparatus of claim 39, wherein the one or more parameters include a data rate, latency, or quality of service related to communication between the device and the base station.

45. The apparatus of claim 39, wherein the one or more parameters include relative strength of signals received at the device from the base station communicating with the device and a neighboring base station.

46. The apparatus of claim 39, wherein the one or more parameters are related to control connectivity of the device with the base station.

* * * * *